US010348712B2

(12) United States Patent
Hoshino et al.

(10) Patent No.: US 10,348,712 B2
(45) Date of Patent: Jul. 9, 2019

(54) APPARATUS, AUTHENTICATION SYSTEM, AND AUTHENTICATION METHOD

(71) Applicants: Tatsuya Hoshino, Kanagawa (JP); Tatsuya Shirai, Kanagawa (JP); Minami Ogawa, Tokyo (JP); Hidenobu Hashikami, Hiroshima (JP); Masafumi Tokiwa, Kanagawa (JP)

(72) Inventors: Tatsuya Hoshino, Kanagawa (JP); Tatsuya Shirai, Kanagawa (JP); Minami Ogawa, Tokyo (JP); Hidenobu Hashikami, Hiroshima (JP); Masafumi Tokiwa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 163 days.

(21) Appl. No.: 15/440,313

(22) Filed: Feb. 23, 2017

(65) Prior Publication Data
US 2017/0250970 A1  Aug. 31, 2017

(30) Foreign Application Priority Data

Feb. 26, 2016 (JP) .................................. 2016-036379
Jan. 10, 2017 (JP) .................................. 2017-001862

(51) Int. Cl.
*H04L 29/06* (2006.01)
*H04L 29/08* (2006.01)

(52) U.S. Cl.
CPC .......... *H04L 63/08* (2013.01); *H04L 63/0807* (2013.01); *H04L 63/0892* (2013.01);
(Continued)

(58) Field of Classification Search
CPC ... H04L 63/08; H04L 63/102; H04L 63/0815; H04L 63/0807; H04L 63/0892; H04L 67/02
See application file for complete search history.

(56) References Cited

U.S. PATENT DOCUMENTS

2004/0111621 A1* 6/2004 Himberger ............ H04L 63/083
  713/182
2004/0260651 A1* 12/2004 Chan ....................... G06F 21/41
  705/50

(Continued)

FOREIGN PATENT DOCUMENTS

| JP | 2004-086510 | 3/2004 |
| JP | 2012-133410 | 7/2012 |
| JP | 5277810 | 8/2013 |

*Primary Examiner* — Robert B Leung
(74) *Attorney, Agent, or Firm* — Harness, Dickey & Pierce, P.L.C.

(57) ABSTRACT

An apparatus is configured for coupling through a network to an external authentication system that allows use of an external service and to a service providing system that provides a given service through authentication performed by the external authentication system. The apparatus includes a web browser and a storing unit. The web browser is configured to transmit to the external authentication system authentication credentials to be used for the authentication performed by the external authentication system to request the authentication to be performed by the external authentication system. The web browser is configured to cause the storing unit to store a first cookie indicating that the authentication credentials have been authenticated. After the storing unit stores a second cookie indicating that the use of the given service has been allowed, the web browser is configured to cause the storing unit to delete the first cookie.

17 Claims, 19 Drawing Sheets

(52) U.S. Cl.
CPC ............ *H04L 63/102* (2013.01); *H04L 67/02* (2013.01); *H04L 63/0815* (2013.01)

(56) References Cited

U.S. PATENT DOCUMENTS

| | | | |
|---|---|---|---|
| 2006/0053299 A1* | 3/2006 | Tomita .................. | G06F 3/0622 713/182 |
| 2007/0067733 A1* | 3/2007 | Moore .............. | G06F 17/30899 715/777 |
| 2009/0100438 A1* | 4/2009 | Hinton .............. | G06F 17/30899 719/311 |
| 2011/0222102 A1* | 9/2011 | Ito ....................... | H04N 1/00204 358/1.14 |
| 2012/0144034 A1* | 6/2012 | McCarty ............. | H04L 63/0823 709/225 |
| 2012/0311689 A1* | 12/2012 | Kron ........................ | G06F 21/33 726/9 |
| 2013/0086656 A1* | 4/2013 | Paddon ................. | G01S 19/246 726/6 |
| 2015/0046987 A1* | 2/2015 | Kanno .................... | H04L 63/08 726/6 |
| 2015/0193099 A1* | 7/2015 | Murphy ................ | G06F 3/0481 715/777 |

\* cited by examiner

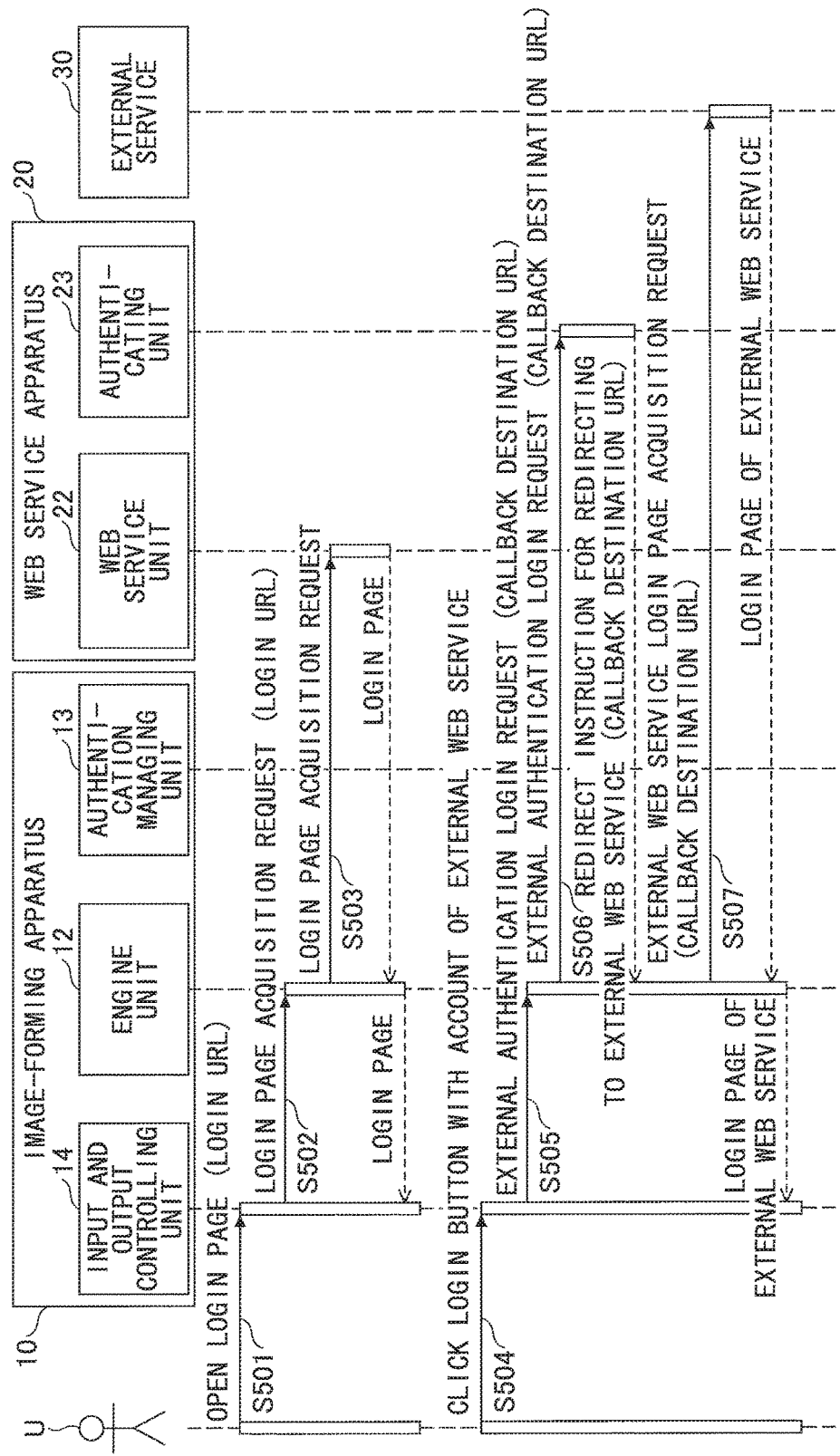

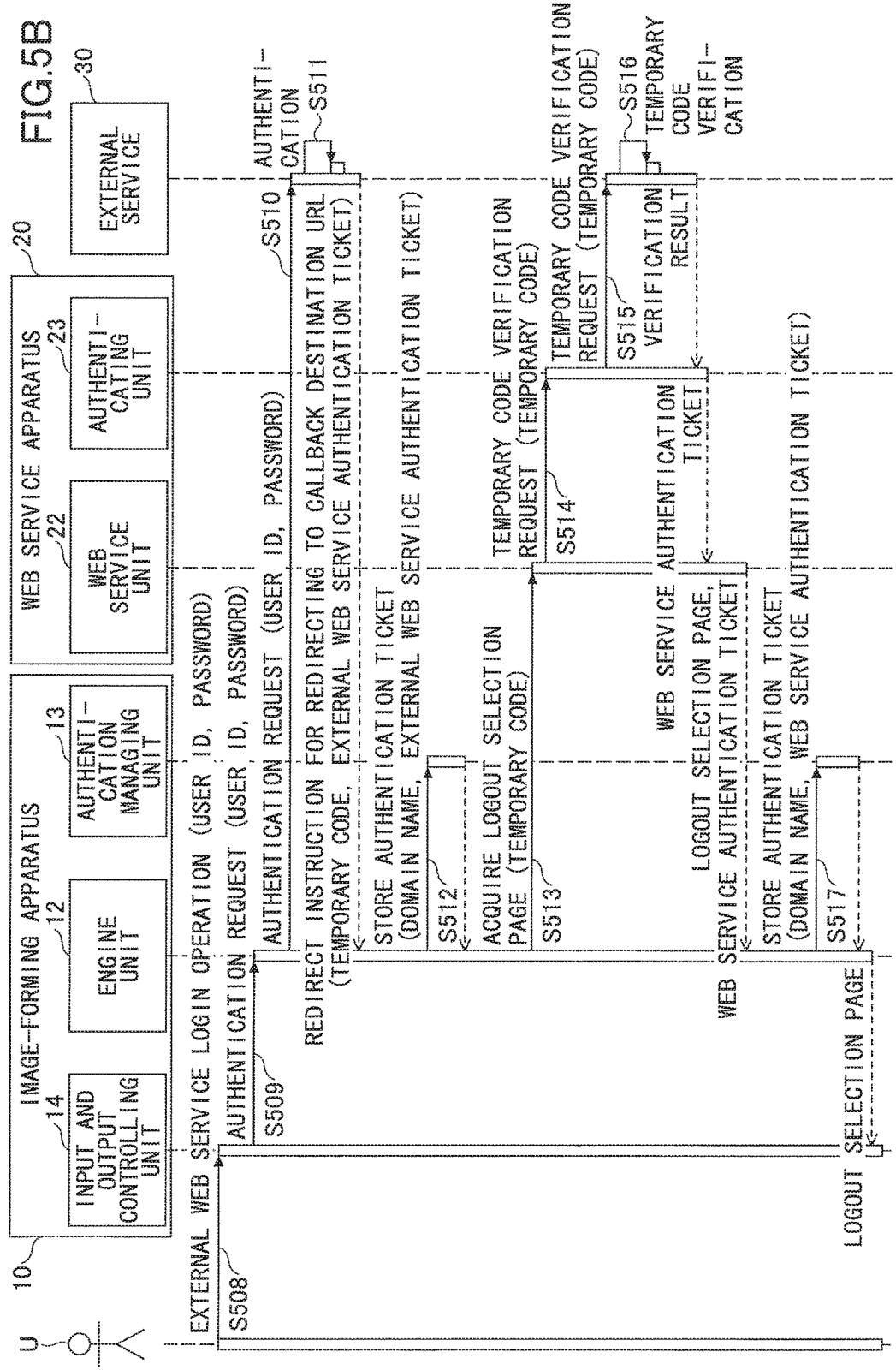

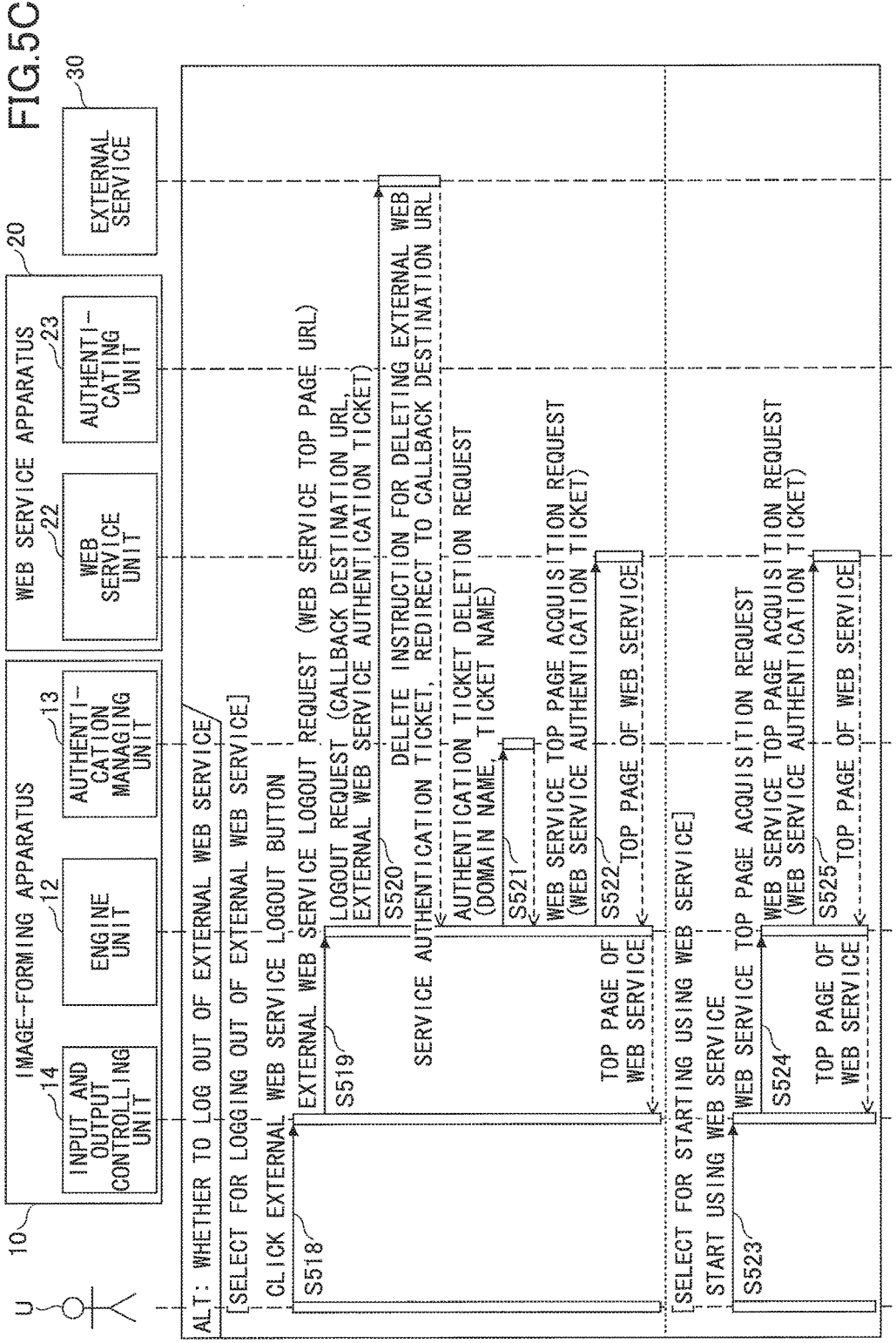

FIG.14

```
<a href="https://service_a.com/logout" target="_blank"
onClick="location.assign('https://example.com/')">
LOG OUT OF EXTERNAL WEB SERVICE
</a>
```
~5000

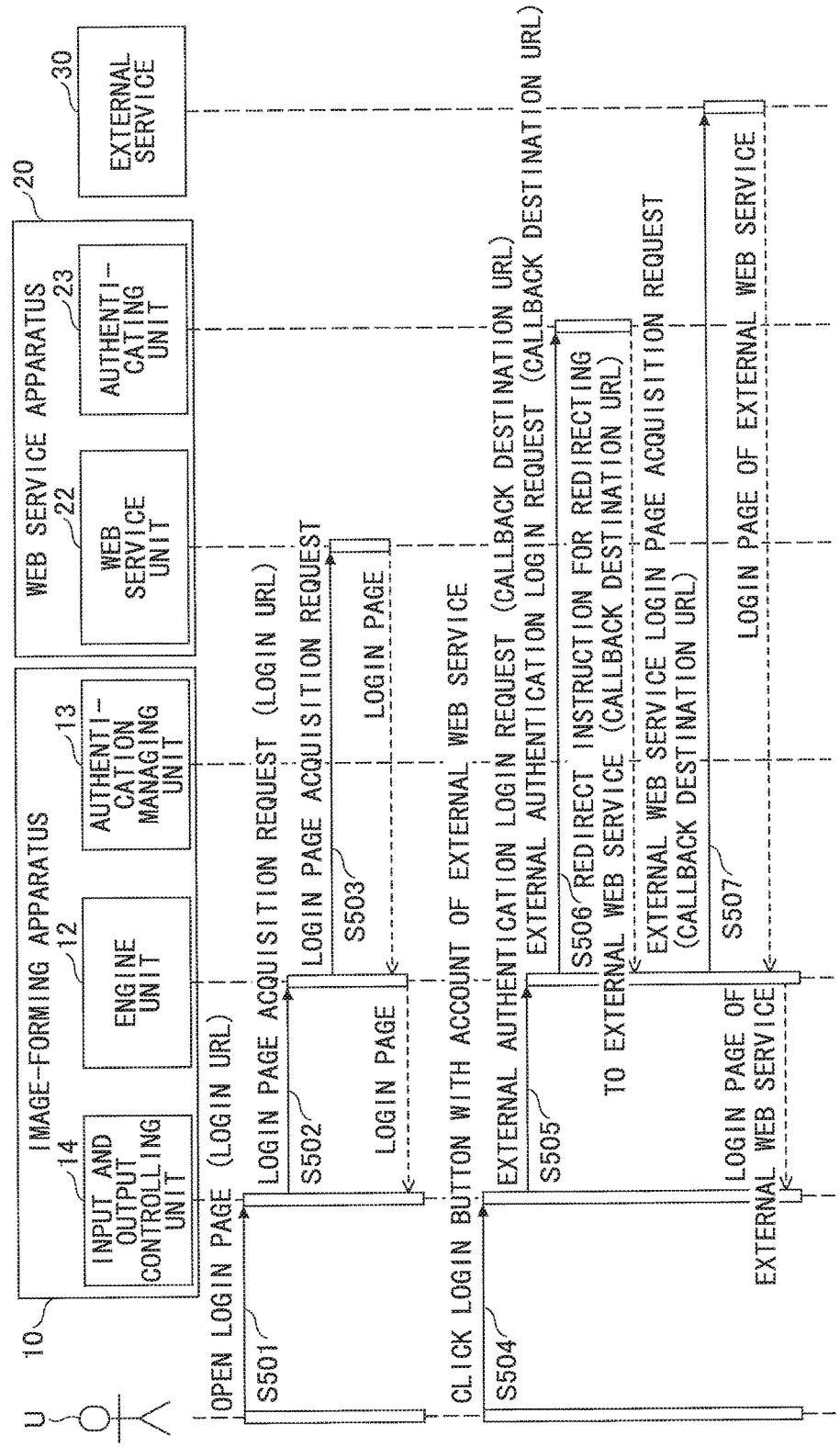

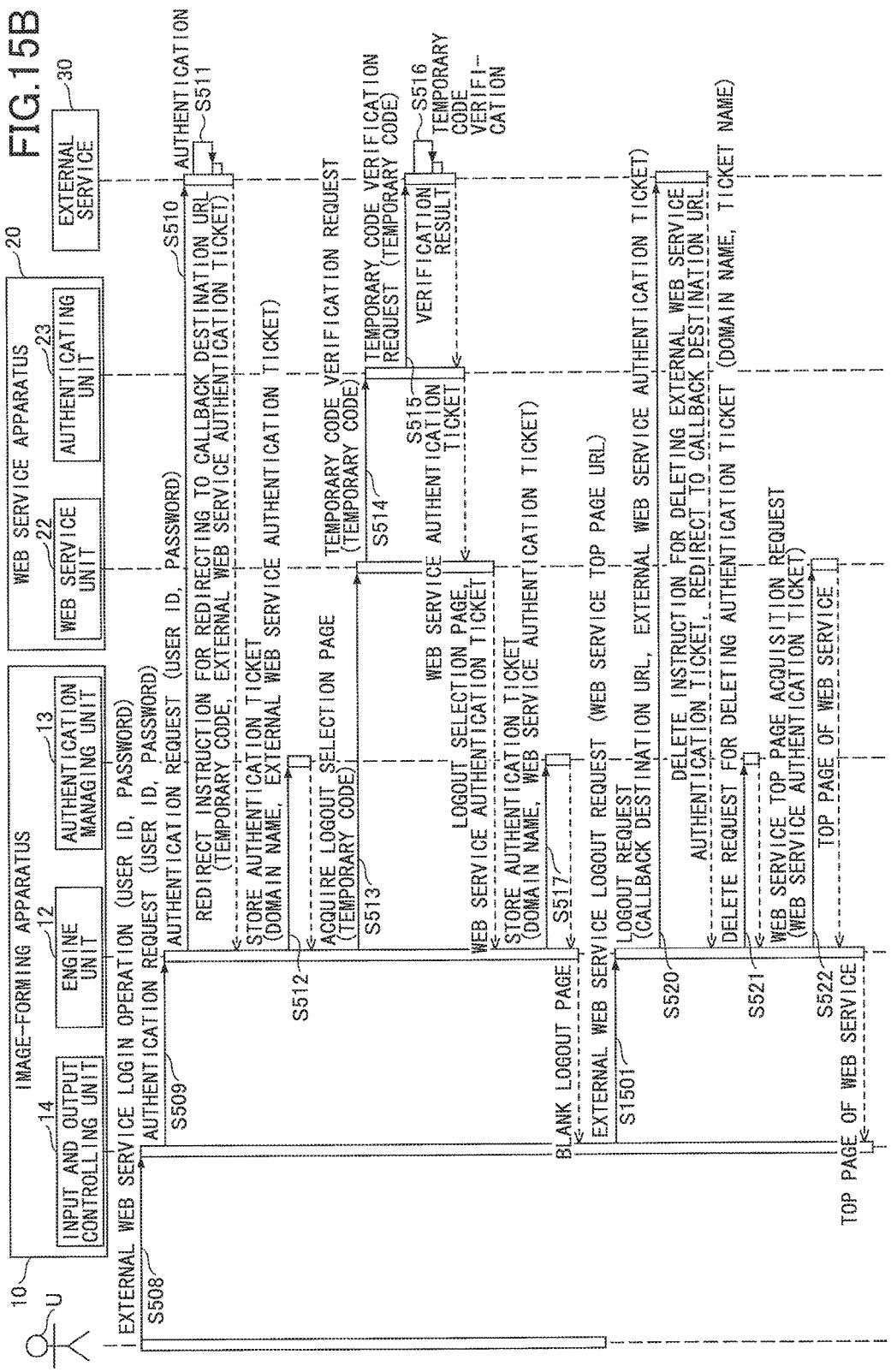

APPARATUS, AUTHENTICATION SYSTEM, AND AUTHENTICATION METHOD

CROSS-REFERENCE TO RELATED APPLICATIONS

The present application claims the benefit of priority under 35 U.S.C. § 119 of Japanese Patent Application No. 2016-036379 filed on Feb. 26, 2016 and Japanese Patent Application No. 2017-001862 filed on Jan. 10, 2017, the entire contents of which are incorporated herein by reference.

BACKGROUND OF THE INVENTION

1. Field of the Invention

The disclosures herein generally relate to an apparatus, an authentication system, and an authentication method.

2. Description of the Related Art

A technology relating to external authentication such as OpenID is known as of recent years. In such external authentication, when a user uses a Web service, authentication is performed by using an account (e.g., user ID and password) of another Web service (i.e., external service). In such a technology, when the user uses the Web service on a Web browser, with the Web browser transiting to the external service, the authentication in the Web service is done using a result of the authentication obtained by using an account of such an external service.

In an image-forming apparatus, as another known technology, when a process that has been allowed by an external authentication server is completed, use of such a process is prohibited (e.g., see Japanese Patent No. 5277810).

SUMMARY OF THE INVENTION

In one embodiment, there is provided an apparatus for coupling through a network to an external authentication system that allows use of an external service and to a service providing system that provides a given service through authentication performed by the external authentication system. The apparatus includes a web browser, and a storing unit configured to store a cookie that is managed through the web browser and that is deletable. The web browser is configured to transmit to the external authentication system authentication credentials to be used for the authentication performed by the external authentication system in response to an input of the authentication credentials to request the authentication to be performed by the external authentication system. The web browser is configured to acquire from the external authentication system a first cookie indicating that the authentication credentials have been authenticated by the external authentication system in accordance with a successful result of the authentication that has been requested, and to cause the storing unit to store the first cookie. After the storing unit stores the first cookie, the web browser is configured to acquire from the service providing system a second cookie indicating that the use of the given service has been allowed, and to cause the storing unit to store the second cookie. After the storing unit stores the second cookie, the web browser is configured to transmit to the external service a request for ending the use of the external service in accordance with an operation for ending the use of the external service on a given screen, to receive a response to the request from the external service, and to cause the storing unit to delete the first cookie.

BRIEF DESCRIPTION OF THE DRAWINGS

FIG. 5A to FIG. 5C are sequence charts of one example of an external authentication process in the first embodiment;

FIG. 14 is a configuration of one example of a "Logout of External Web Service" button;

FIG. 15A and FIG. 15B are sequence charts of one example of an external authentication process in a fourth embodiment.

DESCRIPTION OF THE PREFERRED EMBODIMENTS

In the following, embodiments of the present invention will be described with reference to the accompanying drawings.

First Embodiment

Figure 1:
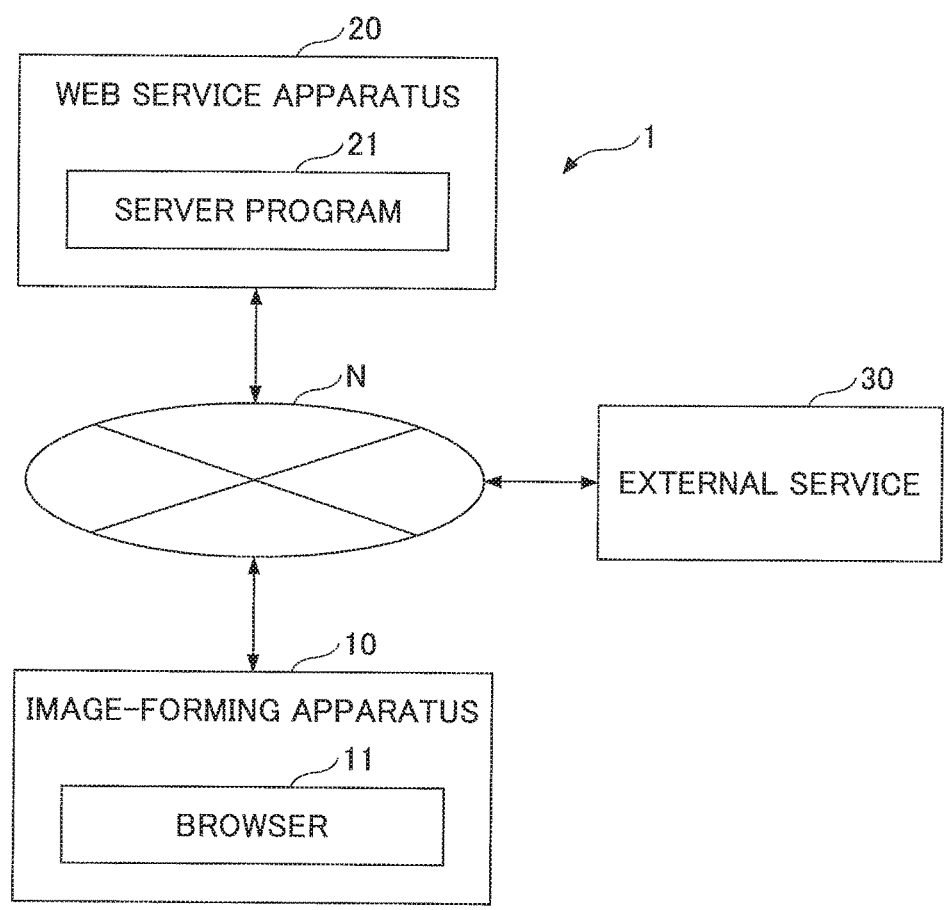
FIG. 1 is a view of a system configuration of one example of an authentication system in a first embodiment.

First, a system configuration of an authentication system 1 in a first embodiment will be described with reference to FIG. 1. FIG. 1 is a view of a system configuration of one example of an authentication system in the first embodiment.

The authentication system 1 illustrated in FIG. 1 includes an image-forming apparatus 10, and a Web service apparatus 20. The image-forming apparatus 10 and the Web service apparatus 20 are communicably coupled to each other via a wide-area network N such as the Internet. The authentication system 1 is also communicably coupled to an external service 30 via the network N.

The image-forming apparatus 10 may be an apparatus such as a Multifunction Peripheral (MFP) or other such all-in-one apparatus. The image-forming apparatus 10 includes a Web browser 11 (hereinafter, simply referred to as "browser 11"). By using the browser 11, a user of the image-forming apparatus 10 is able to use a Web service provided by the Web service apparatus 20. Note that the image-forming apparatus 10 is not limited to an MFP or other such all-in-one apparatus. For example, the image-forming apparatus 10 may be any apparatus such as a whiteboard or a projector.

The Web service apparatus 20 may be an information processing apparatus that provides Web services. The Web service apparatus 20 includes a server program 21. The Web service apparatus 20 provides a Web service via the server program 21, in response to a request from the browser 11. The Web service apparatus 20 authenticates an account of the Web service provided by the external service 30 (i.e., external authentication of, for example, OpenID).

The Web service apparatus 20 performs external authentication in interoperation with the external service 30, when a user of the image-forming apparatus 10 starts using a Web service through the browser 11. Herein, the external service 30 provides various Web services (e.g., Web mail service, Social Networking Service (SNS), blog service, etc.). In addition, the external service 30 may be an external system that authenticates credentials of the user so that the user can use these Web services.

In the following description, the Web service provided by the external service 30 is referred to as an "external Web service" to distinguish from a Web service provided by the Web service apparatus 20.

In the authentication system 1 in the present embodiment as described above, in using a Web service provided by the Web service apparatus 20 through the web browser 11, a user of the image-forming apparatus 10 performs external authentication in interoperation with the external service 30.

In this situation, in the authentication system 1 in the present embodiment, after the user logs into the Web service, the user of the image-forming apparatus 10 is encouraged to log out of the external Web service that has been interoperated in the external authentication.

Hence, in the authentication system 1 in the present embodiment, authentication information of the external Web service (e.g., Cookie managed by the browser 11) is deleted by the user logging out of the external Web service. This configuration prevents illicit use of the user's account.

Figure 2:
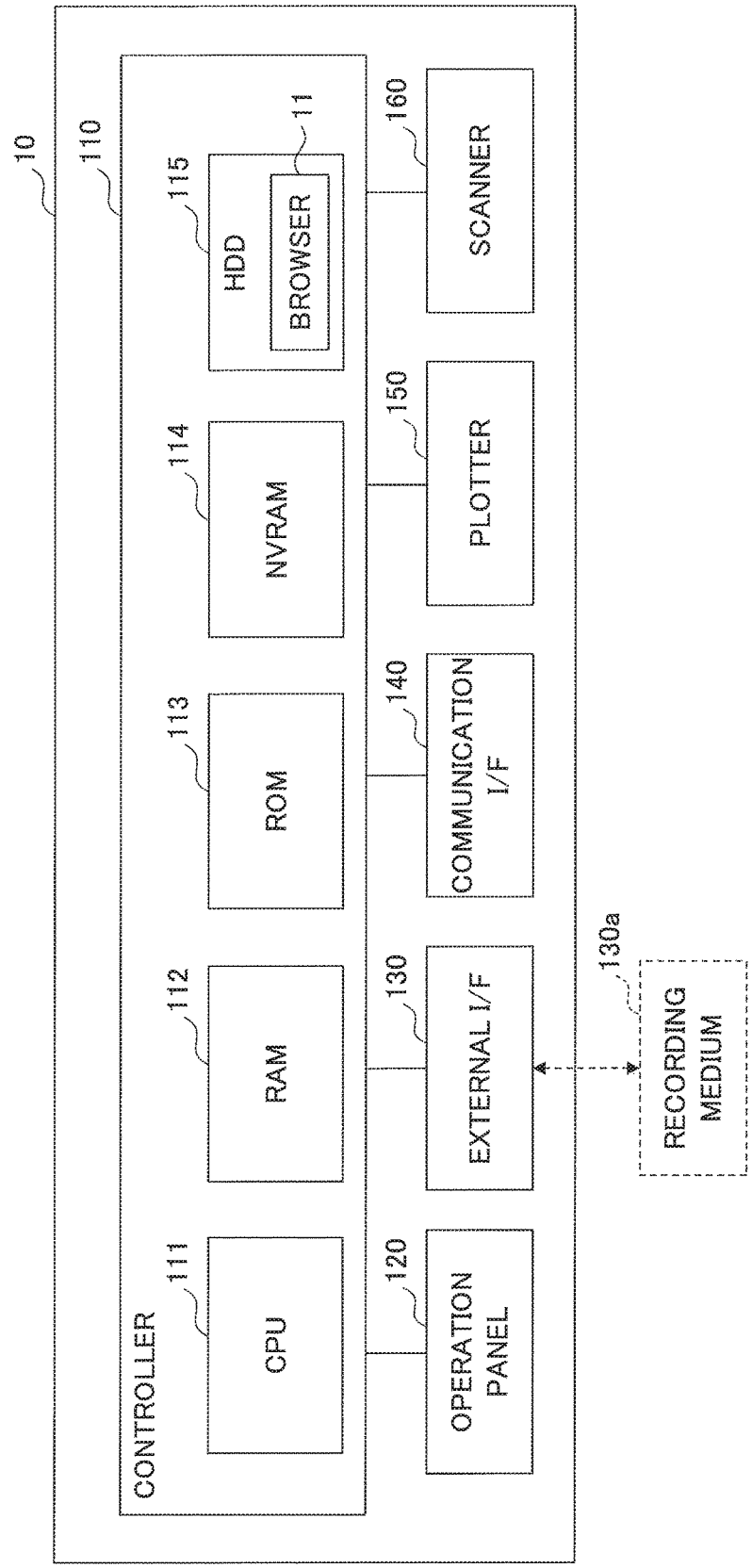
FIG. 2 is a view of a hardware configuration of one example of an image-forming apparatus in the first embodiment.

Next, a hardware configuration of the image-forming apparatus 10 included in the authentication system 1 in the present embodiment will be described with reference to FIG. 2. FIG. 2 is a view of a hardware configuration of one example of an image-forming apparatus in the first embodiment.

The image-forming apparatus 10 illustrated in FIG. 2 includes a controller 110, an operation panel 120, an external I/F 130, a communication I/F 140, a plotter 150, and a scanner 160. The controller 110 includes a Central Processing Unit (CPU) 111, a Random Access Memory (RAM) 112, a Read Only Memory (ROM) 113, an NVRAM 114, and a Hard Disk Drive (HDD) 115.

The ROM 113 may be a non-volatile semiconductor memory (i.e., memory device), in which various programs and data are stored. The RAM 112 may be a volatile semiconductor memory (i.e., memory device), in which a program or data are temporarily held. In the NVRAM 114, for example, setting information is stored. The HDD 115 may be a non-volatile memory device, in which the browser 11, various programs, and data are stored.

The CPU 111 reads the programs, data, and setting information from the ROM 113, the NVRAM 114, and the HDD 115 to be loaded onto the RAM 112, and performs processes. The CPU 111 serves as an operating device that enables the overall control and functionalities of the image-forming apparatus 10.

The operation panel 120 includes an input unit that receives inputs from a user, and a display unit that displays information. The external I/F 130 functions as an interface with an external device. The external device includes a recording medium 130*a*. This configuration enables the image-forming apparatus 10 to read data from the recording medium 130*a* and to write data into the recording medium 130*a*, via the external I/F 130. Note that the recording medium 130*a* may be an IC card, flexible disk, CD, DVD, SD memory card, or USB memory.

The communication I/F 140 functions as an interface to couple the image-forming apparatus 10 to the network N. This configuration enables the image-forming apparatus 10 to perform data communication via the communication I/F 140.

The plotter 150 functions as a printing device that prints data on a portable object (e.g., paper, OHP sheet, plastic film, or copper foil). The scanner 160 functions as a scanning device that scans a manuscript to generate an image file (i.e., electronic file).

The image-forming apparatus 10 in the present embodiment includes the above-described hardware configuration, and thus enables various processes to be described below.

Figure 3:
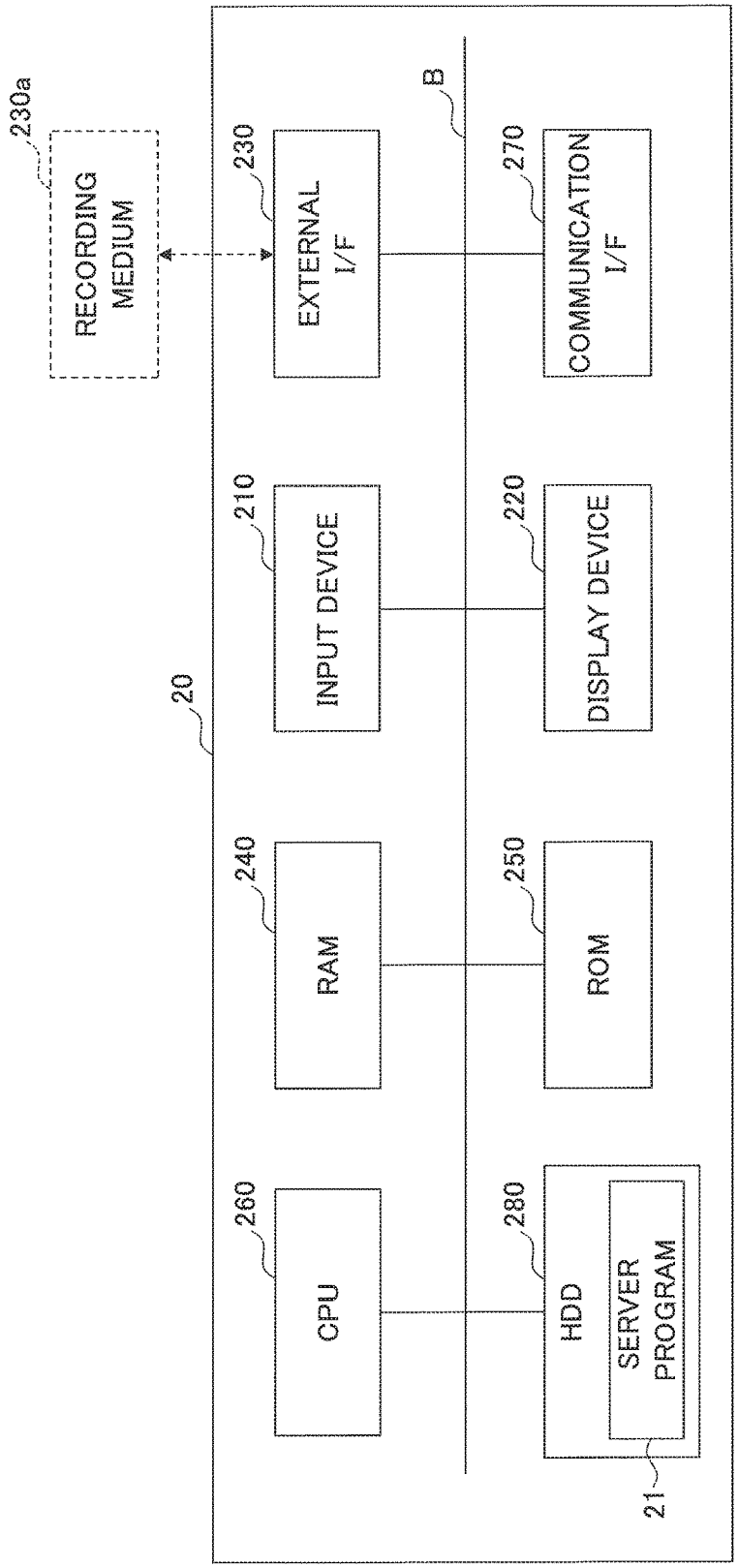
FIG. 3 is a view of a hardware configuration of one example of a Web service apparatus in the first embodiment.

Next, a hardware configuration of the Web service apparatus 20 included in the authentication system 1 in the present embodiment will be described with reference to FIG. 3. FIG. 3 is a view of a hardware configuration of one example of the Web service apparatus in the first embodiment.

The Web service apparatus 20 illustrated in FIG. 3 includes an input device 210, a display device 220, an external I/F 230, and a RAM 240. The Web service apparatus 20 includes a ROM 250, a CPU 260, a communication I/F 270, and a HDD 280. Such pieces of hardware are coupled to each other via a bus B.

The input device 210 may be a keyboard, a mouse, or a touch panel. The input device 210 is used by a user for inputting various operation signals. The display device 220 includes a display, for example, to display a process result of the Web service apparatus 20. At least one of the input device 210 and the display device 220 may be configured to be coupled to the bus B to be used, as appropriate.

The communication I/F 270 functions as an interface that couples the Web service apparatus 20 to the network N. This configuration enables the Web service apparatus 20 to perform data communication via the communication I/F 270.

The HDD 280 may be a non-volatile memory device, in which the server program 21 or various programs and data are stored. The programs and data stored in the HDD 280 include an Operating System (OS), which is basic software that controls the overall Web service apparatus 20 and programs that provide various functions on the OS.

The external I/F 230 functions as an interface with an external device. The external device may be a recording medium 230*a*. This configuration enables the Web service apparatus 20 to read data from the recording medium 230*a* and to write data into the recording medium 230*a*, via the external I/F 230. The recording medium 230*a* may be a flexible disk, CD, DVD, SD memory card, or USB memory.

The ROM 250 may be a non-volatile semiconductor memory (i.e., memory device) capable of holding programs and data, even after the power is off. In the ROM 250, programs and data for Basic Input/Output System (BIOS) to be performed when the Web service apparatus 20 starts up, OS settings, and network settings are stored. The RAM 24 may be a volatile semiconductor memory (i.e., memory device). In the RAM 240, programs and data are temporarily held.

The CPU 260 reads programs and data from the memory devices such as the ROM 250 or the HDD 280, and performs processes. The CPU 260 serves as an operating device that enables the overall control and functionalities of the Web service apparatus 20.

The Web service apparatus 20 in the present embodiment includes the above-described hardware configuration, and thus enables various processes to be described below.

Figure 4:
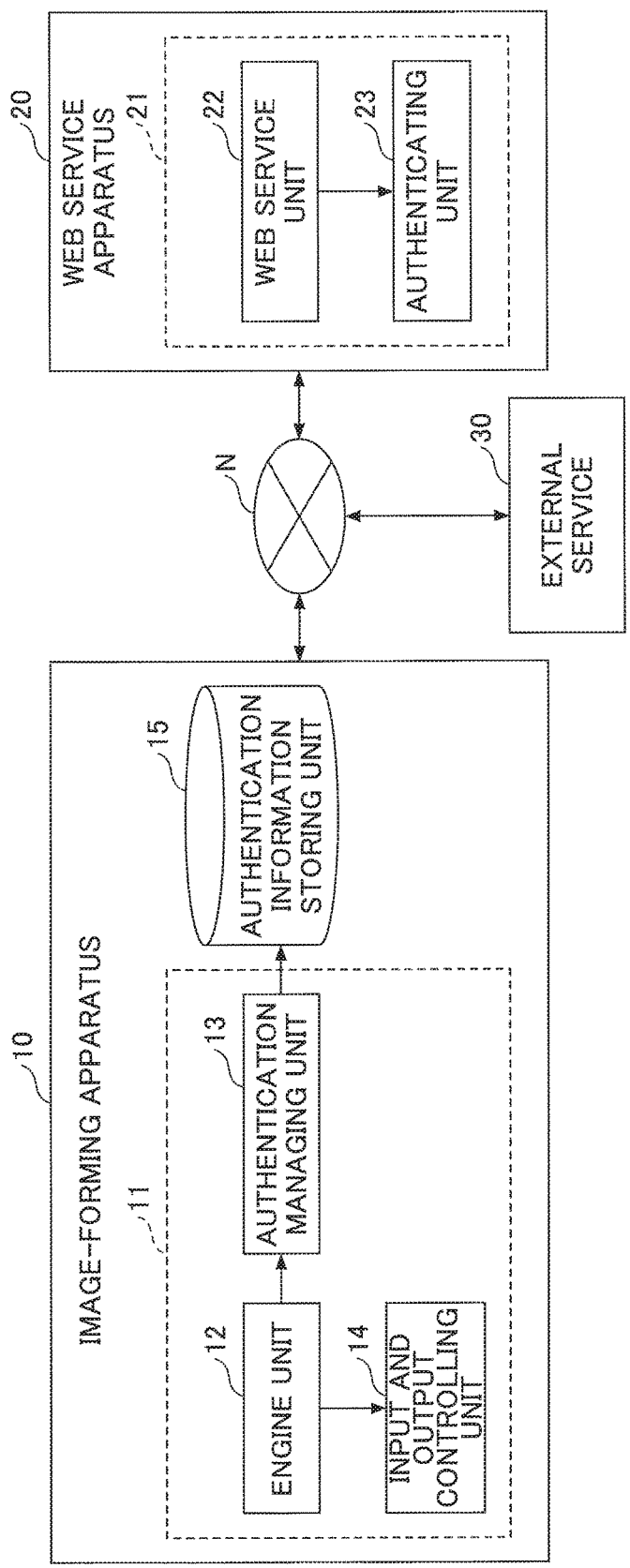
FIG. 4 is a view of a functional configuration of one example of the authentication system in the first embodiment.

Next, a functional configuration of the authentication system 1 in the present embodiment will be described with reference to FIG. 4. FIG. 4 is a view of a functional configuration of one example of an external authentication system in the first embodiment.

The image-forming apparatus 10 illustrated in FIG. 4 includes an engine unit 12, an authentication managing unit 13, and an input and output controlling unit 14. These functional units are enabled by the browser 11 causing the CPU 111 to perform processes.

The image-forming apparatus 10 includes an authentication information storing unit 15. The authentication information storing unit 15 is enabled by, for example, the HDD 115.

The engine unit 12 transmits a request such as a HyperText Transfer Protocol (HTTP) request to the Web service apparatus 20 or the external service 30. The engine unit 12 analyses screen information that has been received as a response to the request, and transmits the screen information to the input and output controlling unit 14. In other words, the engine unit 12 functions as a rendering engine of the browser 11.

Note that the screen information includes information in which screen definitions are written in a page-description language, such as HyperText Markup Language (HTML), Cascading Style Sheets (CSS), and JavaScript (registered trademark).

Additionally, with respect to the authentication information that has been acquired by the engine unit 12 from the Web service apparatus 20 or the external service 30. The engine unit 12 transmits the acquired authentication information to the authentication managing unit 13 so that the acquired authentication information is stored (recorded) in the authentication information storing unit 15. In the following description, it is assumed that the authentication information of a Web service and an external Web service are Cookie values, as one example. Such authentication information is also referred to as an "authentication ticket".

The authentication managing unit 13 manages the authentication information storing unit 15. The authentication managing unit 13 stores the authentication ticket received from the engine unit 12 in the authentication information storing unit 15.

The input and output controlling unit 14 causes the operation panel 120 to display a Web page in accordance with the screen information that has been received from the engine unit 12. The input and output controlling unit 14 also receives the user's various operations on the Web page.

The authentication information storing unit 15 may be a recording area managed by the authentication managing unit 13. The authentication ticket is stored in the authentication information storing unit 15. Note that the authentication ticket stored in the authentication information storing unit 15 will be described later in detail.

The Web service apparatus 20 illustrated in FIG. 4 includes a Web service unit 22, and an authenticating unit 23. These functional units are enabled by the server program 21 causing the CPU 260 to perform processes.

The Web service unit 22 receives an HTTP request from the engine unit 12, and transmits a response, such as a HTTP response to the HTTP request. For example, the Web service unit 22 receives a page acquisition request from the engine unit 12, and transmits screen information of a corresponding page in response to the page acquisition request.

In response to an authentication request from the engine unit 12 (i.e., authentication request using external authentication), the authenticating unit 23 redirects the received authentication request to, for example, a login page of an external Web service provided by the external service 30. The authenticating unit 23 also generates an authentication ticket of the Web service provided by the Web service apparatus 20.

Next, an external authentication process performed by the authentication system 1 in the present embodiment will be described with reference to FIG. 5A to FIG. 5C. FIG. 5A to FIG. 5C are sequence charts of one example of an external authentication process in the first embodiment. In the following description, when a user of the image-forming apparatus 10 uses a Web service through the browser 11, the external authentication is performed by using an account of the external Web service.

First, a user U operates the browser 11 of the image-forming apparatus 10 to open a login page of the Web service provided by the Web service apparatus 20 (step S501). Note that the operation can be performed, for example, by inputting a Uniform Resource Locator (URL) indicating the login page of the Web service, or by selecting the login page of the Web service from a list of bookmarks that are displayed.

On receiving an operation of opening the login page of the Web service, the input and output controlling unit 14 transmits a login page acquisition request for acquiring the login page to the engine unit 12 (step S502). Note that the login page acquisition request includes a URL indicating the login page (i.e., login URL).

On receiving the login page acquisition request for acquiring the login page, the engine unit 12 transmits the login page acquisition request to the Web service unit 22 of the Web service apparatus (step S503). Then, the Web service unit 22 of the Web service apparatus 20 responds with screen information of the login page through the engine unit 12 of the image-forming apparatus 10 to the input and output controlling unit 14. Note that the engine unit 12 analyses the screen information of the login page that has been responded from the Web service unit 22.

Figure 6:
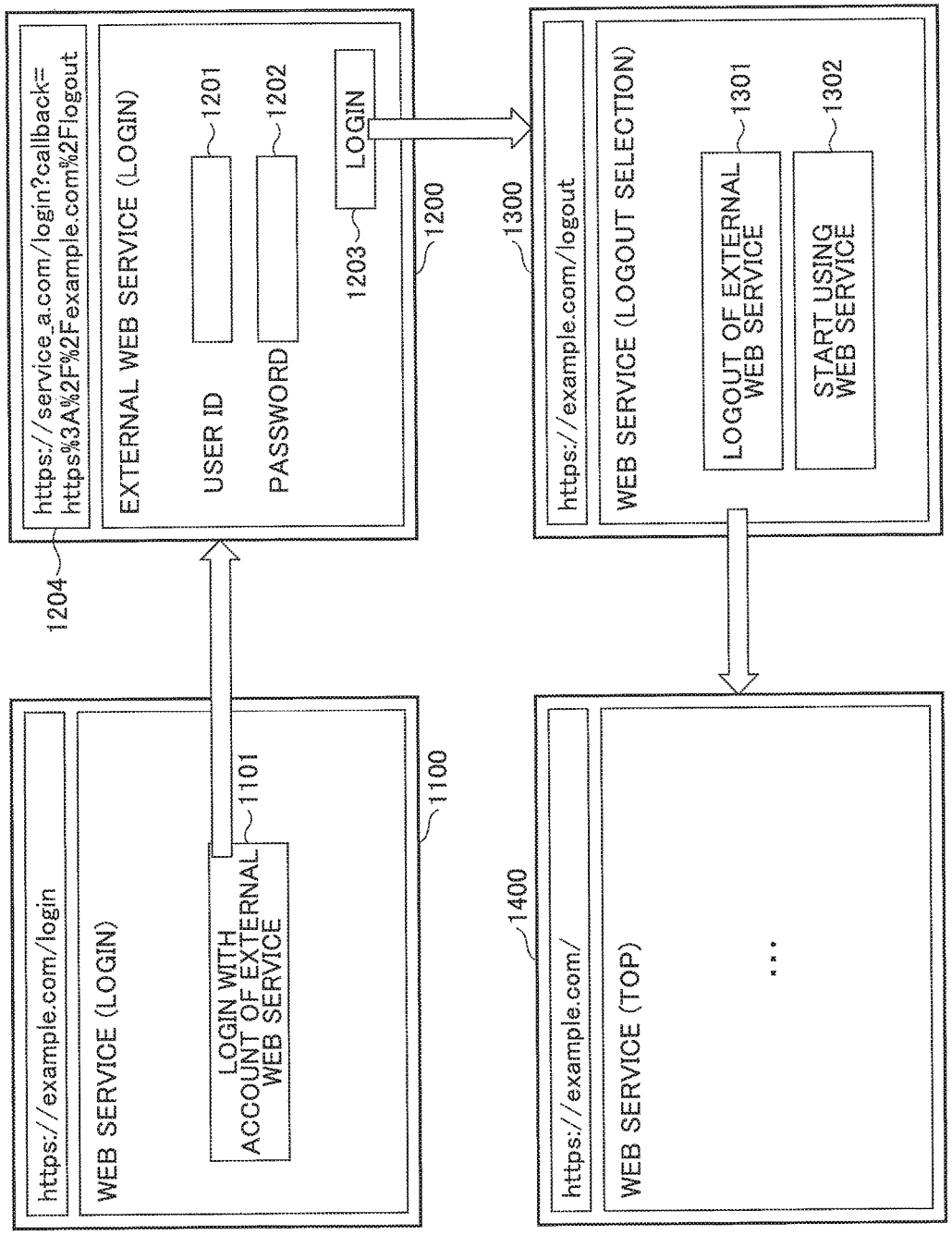
FIG. 6 is a view of a screen display transition of one example in the external authentication process in the first embodiment.

Accordingly, the input and output controlling unit 14 causes the operation panel 120 of the image-forming apparatus 10 to display, for example, a Web service login page 1100 illustrated in FIG. 6. The Web service login page 1100 illustrated in FIG. 6 is a screen display for logging into the Web service provided by the Web service apparatus 20. The Web service login page 1100 includes a "Login with External Web Account" button 1101.

The button 1101 may be a display portion for logging into the Web service, with the use of an account of an external Web service provided by the external service 30 (i.e., display portion for logging into the Web service through the external authentication).

The user U clicks the "Login with External Web Account" button 1101 on the Web service login page 1100 illustrated in FIG. 6 (step S504). Note that a URL indicating a logout selection page 1300 (i.e., URL defined in HTML tags, for example) is embedded in the "Login with External Web Account" button 1101. The logout selection page 1300 will be described later.

On receiving such an operation of clicking the "Login with External Web Account" button 1101, the input and output controlling unit 14 transmits to the engine unit 12 an external authentication login request for logging into the Web service through the external authentication (step S505). Note that the external authentication login request includes the URL serving as a callback destination URL, which is embedded in the "Login with External Web Account" button 1101.

On receiving the external authentication login request, the engine unit 12 transmits the received external authentication login request to the authenticating unit 23 of the Web service apparatus (step S506). Then, the authenticating unit 23 of the Web service apparatus 20 responds with a redirect instruction for redirecting the browser 11 to the external Web service (i.e., redirect instruction for redirecting the browser 11 to the login page of the external Web service). Note that the redirect instruction includes the callback destination URL.

On receiving the redirect instruction, the engine unit 12 transmits to the external service 30 a login page acquisition request for acquiring the login page of the external Web service (step S507). Note that the login page acquisition request includes the callback destination URL.

Then, the external service 30 transmits screen information of a login page of the external Web service through the engine unit 12 of the image-forming apparatus 10 to the input and output controlling unit 14. Note that the engine unit 12 analyses the screen information of the login page of the external Web service that has been responded from the external service 30.

Accordingly, the input and output controlling unit 14 causes the operation panel 120 of the image-forming apparatus 10 to display, for example, an external Web service login page 1200 illustrated in FIG. 6. The external Web service login page 1200 illustrated in FIG. 6 may be a screen display for logging into the external Web service provided by the external service 30.

The external Web service login page 1200 illustrated in FIG. 6 includes a user ID field 1201, a password field 1202, a login button 1203, and a URL field 1204. Note that in the URL field 1204, a URL "http://service_a.com/login" indicating the external Web service login page 1200 is written, followed by the URL indicating the logout selection page 1300 that is the callback destination URL.

The user U enters a user ID in the user ID field 1201 and a password in the password field 1202 on the external Web service login page 1200 illustrated in FIG. 6, and then clicks the login button 1203 (step S508).

Herein, the user ID to be entered in the user ID field 1201 and the password to be entered in the password field 1202 are the user ID and the password for logging into the external Web service (i.e., account of the external Web service). Note that the user ID is identification information for uniquely identifying the user U in the external Web service. The user ID may be, for example, any character strings such as alpha-numerical characters, a telephone number, or an e-mail address.

On receiving an operation of clicking the login button 1203, the input and output controlling unit 14 transmits to the engine unit 12 an authentication request for logging into the external Web service (step S509). Note that the authentication request includes the user ID and the password (i.e., account of the external Web service) that have been entered by the user U in the external Web service login page 1200.

On receiving the authentication request for logging into the external Web service, the engine unit 12 transmits the authentication request to the external service 30 (step S510). Then, the external service 30 performs the authentication process based on the user ID and the password included in the authentication request (step S511). In the following description, it is assumed that a result of the authentication process performed by the external service 30 indicates success in the authentication process.

In this case, the external service 30 transmits to the engine unit 12 of the image-forming apparatus 10 the redirect instruction for redirecting the browser 11 to the callback destination URL. Note that the redirect instruction includes a temporary code generated by the external service 30 and an authentication ticket of the external Web service. Such a temporary code may be referred to as an "authorization code".

On receiving the redirect instruction for redirecting the browser 11 to the callback destination URL, the engine unit 12 first transmits to the authentication managing unit 13 an authentication ticket storing request for storing the authentication ticket (step S512). Note that the storing request includes a domain name of the external Web service and the external Web service authentication ticket.

On receiving the authentication ticket storing request, the authentication managing unit 13 stores the authentication ticket (i.e., authentication ticket of the external Web service) included in the authentication ticket storing request in association with the domain name (i.e., domain name of the external Web service), in the authentication information storing unit 15. Note that the authentication ticket includes, for example, a ticket name, a value of the authentication ticket (i.e., Cookie value), and an expiring date.

Figure 7:
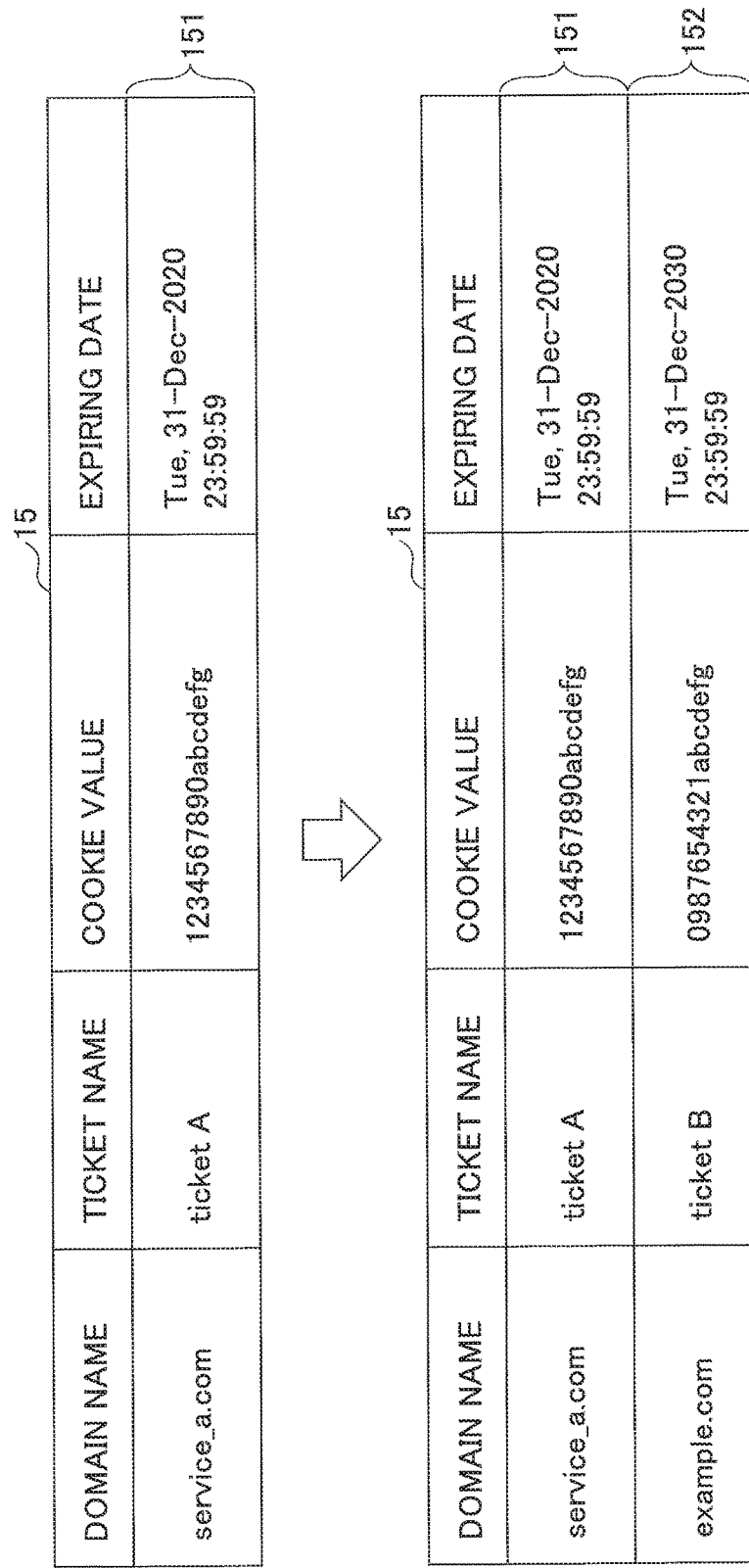
FIG. 7 is a view of one example of an authentication ticket.

Herein, an upper table of FIG. 7 illustrates one example of the authentication ticket stored in the authentication information storing unit 15, after the process in step S512 is performed. As illustrated in the upper table of FIG. 7, an authentication ticket 151 in association with a domain name "service_a.com" is stored in the authentication information storing unit 15. In this manner, the authentication ticket is stored in association with the domain name of the service that has issued the authentication ticket. Deletion of the authentication ticket is allowed only to the service of the domain (i.e., the service that has issued the authentication ticket).

Next, the engine unit 12 transmits to the Web service unit 22 of the Web service apparatus 20 a logout selection page acquisition request for acquiring the logout selection page 1300 indicated by the callback destination URL (step S513). Note that the logout selection page acquisition request includes the temporary code acquired from the external service 30 in step S511.

On receiving the logout selection page acquisition request for acquiring the logout selection page 1300, the Web service unit 22 transmits to the authenticating unit 23 a temporary code verification request for verifying the temporary code (step S514). Note that the temporary code verification request includes the temporary code.

On receiving the temporary code verification request, the authenticating unit 23 transmits the temporary code verification request to the external service 30 (step S515). Then, the external service 30 performs a verifying process on the temporary code included in the temporary code verification request (step S516). In the following description, it is assumed that a verification result in the verifying process performed by the external service 30 is verification success (i.e., the verification result indicates that the temporary code is a valid one).

In this case, the external service 30 transmits to the authenticating unit 23 of the Web service apparatus 20 the verification result indicating that the temporary code is a valid one. On receiving the verification result, the authenticating unit 23 of the Web service apparatus 20 generates a Web service authentication ticket of a Web service provided by the Web service apparatus 20. Then, the authenticating unit 23 of the Web service apparatus 20 transmits the Web service authentication ticket to the Web service unit 22.

The Web service unit 22 transmits the Web service authentication ticket and screen information of the logout selection page 1300 to the engine unit 12 of the image-forming apparatus 10.

On receiving the Web service authentication ticket and the screen information of the logout selection page 1300, the engine unit 12 first transmits the authentication ticket storing request to the authentication managing unit 13 (step S517). Note that the authentication ticket storing request includes the domain name of the Web service and the Web service authentication ticket.

On receiving the authentication ticket storing request, the authentication managing unit 13 stores in the authentication information storing unit 15 the authentication ticket (i.e., authentication ticket of the Web service) included in the authentication ticket storing request in association with the domain name (i.e., domain name of the Web service).

Herein, a lower table of FIG. 7 illustrates one example of the authentication tickets stored in the authentication information storing unit 15, after the process in step S517 is performed. As illustrated in the lower table of FIG. 7, an authentication ticket 152 in association with a domain name "example.com" of a Web service is additionally stored in the authentication information storing unit 15. This configuration allows the user U of the image-forming apparatus 10 to use the Web service provided by the Web service apparatus 20.

Then, the engine unit 12 analyses the screen information of the logout selection page 1300. The engine unit 12 transmits the analyzed screen information to the input and output controlling unit 14.

Accordingly, the input and output controlling unit 14 causes the operation panel 120 of the image-forming apparatus 10 to display, for example, the logout selection page 1300 illustrated in FIG. 6. The logout selection page 1300 illustrated in FIG. 6 is a screen display on which the user U is able to select logging out of the external Web service. The logout selection page 1300 includes a "Logout of External Web service" button 1301 and a "Start Using Web Service" button 1302.

As will be described later, in a case where the user U clicks the "Logout of External Web Service" button 1301 on the logout selection page 1300, the user U is able to use the Web service after logging out of the external Web service. In contrast, in a case where the user U clicks the "Start Using Web Service" button 1302 on the logout selection page 1300, the user U is able to use the Web service while being logged in the external Web service (i.e., without logging out of the external Web service).

Herein, in the case where the user U clicks the "Logout of External Web Service" button 1301 (step S518), the input and output controlling unit 14 receives such an operation of clicking the button, and transmits a logout request for logging out of the external Web service to the engine unit 12 (step S519).

Note that a URL indicating a Web service top page 1400, as will be described later, is embedded in the "Logout of External Web Service" button 1301. Therefore, the logout request for logging out of the external Web service includes the URL indicating the Web service top page 1400.

On receiving the logout request for logging out of the external Web service, the engine unit 12 transmits the logout request for logging out of the external Web service to the external service 30 (step S520).

Herein, the logout request for logging out of the external Web service includes the Web service authentication ticket and the callback destination URL (i.e., URL embedded in the "Logout of External Web Service" button 1301). To be specific, the engine unit 12 transmits, for example, a logout request 2000 illustrated in FIG. 8 to a Web API (i.e., logout WebAPI) that is made available to the public by the external service 30.

Subsequently, the external service 30 responds with a delete instruction for deleting the external Web service authentication ticket and the redirect instruction for redirecting the browser 11 to the callback destination URL, to the engine unit 12 of the image-forming apparatus 10.

Figure 8:
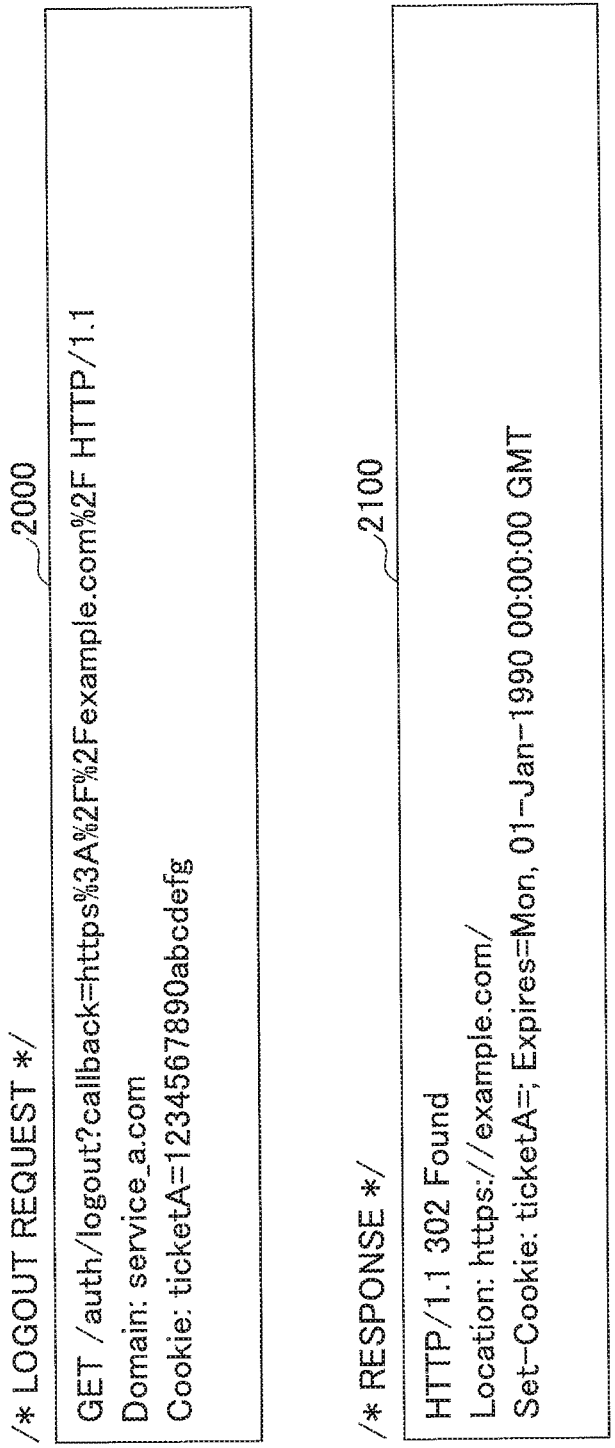
FIG. 8 is a view of one example of a logout request and a response to be transmitted to an external service.

That is to say, the external service 30 responds with, for example, a response 2100 illustrated in FIG. 8, as the delete instruction for deleting the external Web service authentication ticket, to the engine unit 12 of the image-forming apparatus 10. In this manner, to delete the authentication ticket, a ticket name of the authentication ticket is specified and an expiring date is set to an already passed time and date.

On receiving the delete instruction for deleting the external Web service authentication ticket and the redirect instruction for redirecting the browser 11 to the callback destination URL, the engine unit 12 first transmits the authentication ticket deletion request for deleting the authentication ticket to the authentication managing unit 13 (step S521). Note that the authentication ticket deletion request includes the domain name of the external Web service and the ticket name of the external Web service authentication ticket.

On receiving the delete instruction for deleting the authentication ticket, the authentication managing unit 13 deletes the authentication ticket that is stored in association with the domain name included in the delete instruction and that has the ticket name included in the delete instruction, from the authentication information storing unit 15.

To be specific, the authentication managing unit 13 deletes the authentication ticket 151, which is stored in association with the domain name "service_a.com" of the external Web service and which has a ticket name "ticket A", from the authentication information storing unit 15. This allows the user U of the image-forming apparatus 10 to log out of the external Web service provided by the external service 30. Thus, the user U is unable to use the external Web service through the browser 11 of the image-forming apparatus 10.

Next, the engine unit 12 transmits to the Web service unit 22 of the Web service apparatus 20 an acquisition request for acquiring the Web service top page 1400 indicated by the callback destination URL (step S522). Note that the acquisition request includes the Web service authentication ticket.

Then, the Web service unit 22 of the Web service apparatus 20 responds with screen information of the Web service top page 1400 through the engine unit 12 of the image-forming apparatus 10, to the input and output controlling unit 14. Note that the engine unit 12 analyses the screen information of the Web service top page 1400, which has been responded from the Web service unit 22.

Accordingly, the input and output controlling unit 14 causes the operation panel 120 of the image-forming apparatus 10 to display, for example, the Web service top page 1400 illustrated in FIG. 6.

In the authentication system 1 in the present embodiment, as described above, after the authentication to the Web service is performed through the external authentication by using the account of the external Web service, the screen display for encouraging the user U to log out of the external Web service (e.g., logout selection page 1300) appears. Therefore, in the authentication system 1 in the present embodiment, it is possible to avoid a situation where a third party fraudulently uses the external Web service, owing to the external Web service authentication ticket stored in the image-forming apparatus 10.

Alternatively, in a case where the user U clicks the "Start Using Web Service" button 1302 (step S523), the input and output controlling unit 14 receives such an operation of clicking the button and transmits the acquisition request for acquiring the Web service top page 1400 to the engine unit 12 (step S524).

Note that a URL indicating the Web service top page 1400 is embedded in the "Start Using Web Service" button 1302. Accordingly, the acquisition request for acquiring the Web service top page 1400 includes the URL indicating the Web service top page 1400.

On receiving the acquisition request for acquiring the Web service top page 1400, the engine unit 12 transmits the acquisition request to the Web service unit 22 of the Web service apparatus 20 (step S525). Note that the acquisition request includes the Web service authentication ticket.

Then, the Web service unit 22 of the Web service apparatus 20 responds with screen information of the Web service top page 1400 through the engine unit 12, to the input and output controlling unit 14. Note that the engine unit 12 analyses the screen information of the Web service top page 1400 that has been responded from the Web service unit 22.

Accordingly, the input and output controlling unit 14 causes the operation panel 120 of the image-forming apparatus 10 to display, for example, the Web service top page 1400 illustrated in FIG. 6.

In the case where the user U clicks the "Start Using Web Service" button 1302 on the logout selection page 1300, as described above, the user U is able to use the Web service while being logged in the external Web service. When using the external Web service while using the Web service, the user U can click the "Start Using Web Service" button 1302.

In the authentication system 1 in the present embodiment, in the case where the user U logs into the Web service through the external authentication such as OpenID, it is possible to encourage the user U to log out of the external Web service that has been used in the external authentication. In the authentication system 1 in the present embodiment, it is possible to avoid a situation where the authentication information of the external Web service remains stored in the image-forming apparatus 10 against a user's intention.

Therefore, in the authentication system 1 in the present embodiment, it is possible to avoid a situation where a third party fraudulently uses the external Web service, owing to the external Web service authentication ticket stored in the image-forming apparatus 10.

Additionally, in the authentication system 1 in the present embodiment, a page for encouraging the user U to log out of the external Web service is displayed in sequential page transitions for using a Web service. This configuration enables the user U to log out of the external Web service with a simple operation, for example, without explicitly accessing the external Web service.

Note that in the authentication system 1 in the present embodiment, the user U logs out of the external Web service by clicking the "Logout of External Web Service" button 1301 on the logout selection page 1300. However, the present embodiment is not limited to this. In the authentication system 1 in the present embodiment, for example, after the user U clicks the login button 1203 on the external Web service login page 1200, the Web service top page 1400 can be displayed without the logout selection page 1300 being displayed. In this case, for example, JavaScript embedded in the Web service top page 1400 may allow the user U to be logged out of the external Web service. By clicking the login button 1203 on the external Web service login page 1200, the user U may be logged out of the external Web service automatically.

Additionally, the user U is able to delete from the authentication information storing unit 15 all of the authentication information (i.e., collective deletion) such as Cookie by using functionality of the browser 11. In this case, however, not only the authentication information of the external Web service but also the authentication information of the Web service might be deleted. In other words, in such a case, the authentication information necessary for the user U to use the Web service might also be deleted. In contrast, the authentication system 1 in the present embodiment enables the user U to delete only the authentication information of the external Web service from the authentication information storing unit 15.

Second Embodiment

Next, a second embodiment will be described. In the second embodiment, a case where the Web service apparatus 20 is capable of interoperating with a plurality of external services 30 for the external authentication will be described.

Note that in the second embodiment, only differences from the first embodiment will be described. Components and processes having substantially same functional configurations as those defined in the first embodiment are referred to by the same numerals; accordingly, their descriptions are omitted as appropriate.

Figure 9:
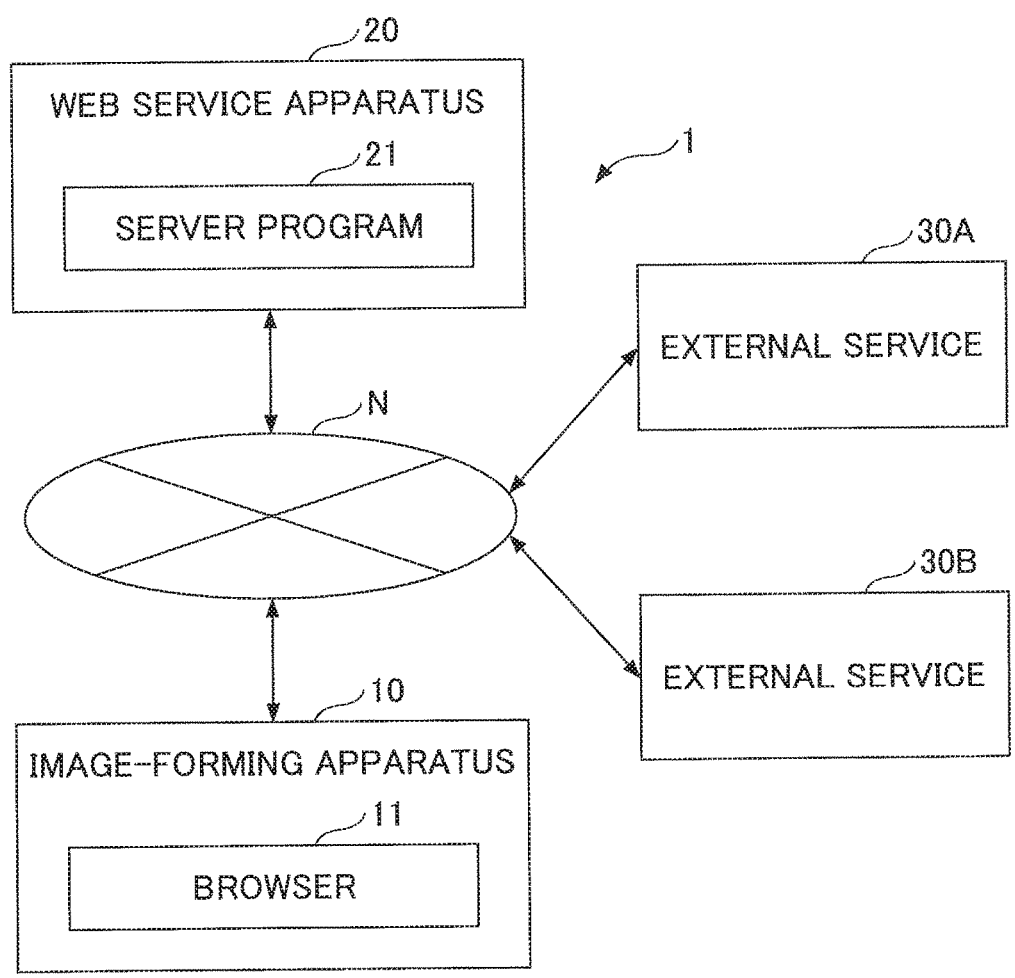
FIG. 9 is a view of a system configuration of one example of an external authentication system in a second embodiment.

First, a system configuration of the authentication system 1 in the present embodiment will be described with reference to FIG. 9. FIG. 9 is a system configuration of one example of an external authentication system in the second embodiment.

The authentication system 1 illustrated in FIG. 9 is communicably coupled through the network N to a plurality of external services 30. That is to say, the Web service apparatus 20 included in the authentication system 1 in the present embodiment is capable of performing the external authentication in interoperation with each of the plurality of external services 30.

Note that in the following description, it is assumed that the Web service apparatus 20 included in the authentication system 1 in the present embodiment is capable of performing the external authentication in interoperation with each of external services 30A and 30B. In other words, the Web service apparatus 20 included in the authentication system 1 in the present embodiment is capable of performing the external authentication in interoperation with either the external service 30A or the external service 30B, depending on user's selection when the user U uses the image-forming apparatus 10.

In the following description, a Web service provided by the external service 30A is referred to as an "external Web service A", and a Web service provided by the external service 30B is referred to as an "external Web service B".

Figure 10:
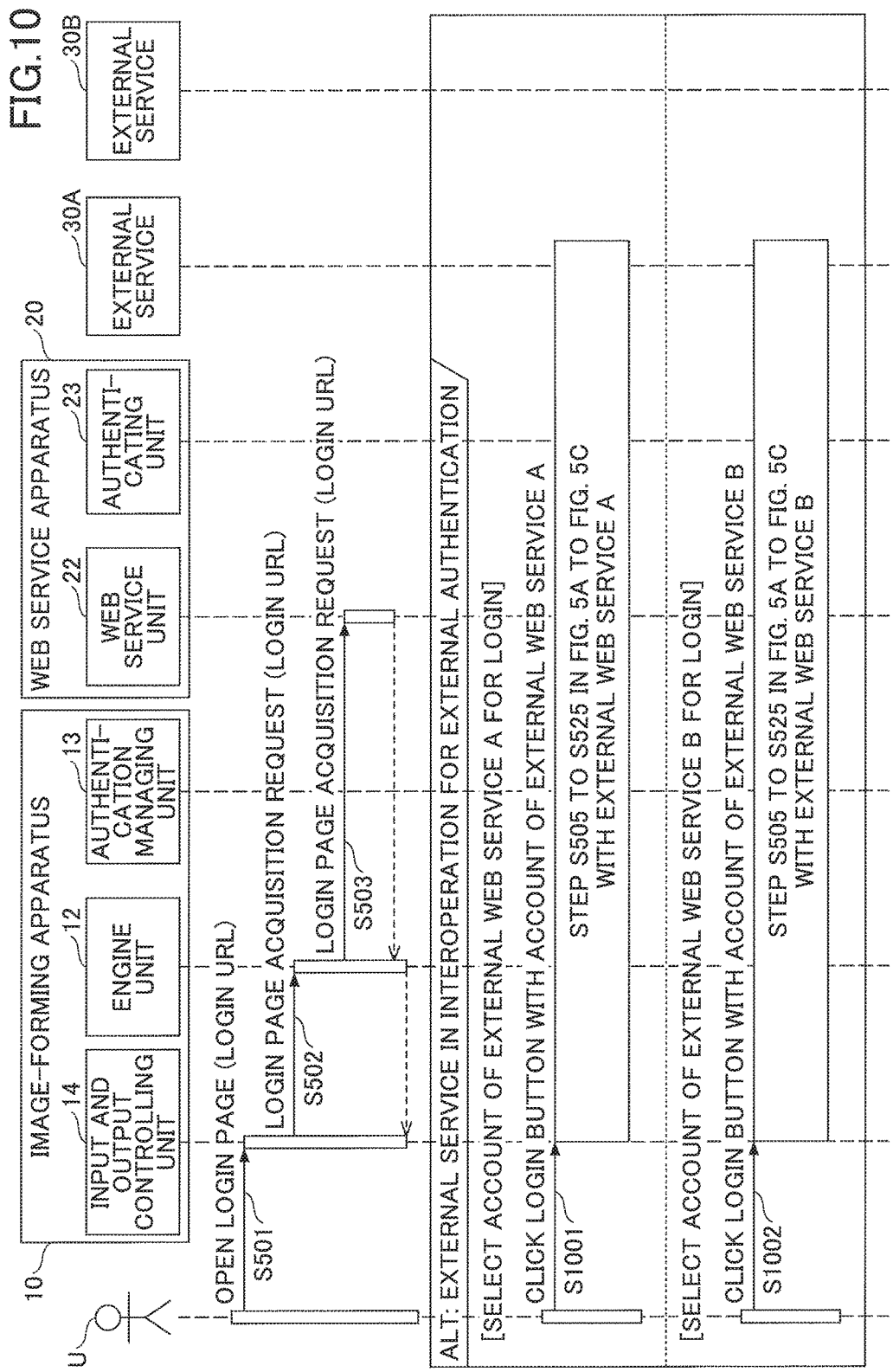
FIG. 10 is a sequence chart of one example of an external authentication process in the second embodiment.

Next, an external authentication process performed by the authentication system 1 in the present embodiment will be described with reference to FIG. 10. FIG. 10 is a sequence chart of one example of an external authentication process in the second embodiment. In the following description, it is assumed that when the user U of the image-forming apparatus 10 uses the Web service through the browser 11, the external authentication is performed by using either an account of the external Web account A or an account of the external Web account B.

First, step S501 to step S503 are the same as step S501 to step S503 in the first embodiment. After these processes, the input and output controlling unit 14 causes the operation panel 120 of the image-forming apparatus 10 to display, for example, a Web service login page 3100 illustrated in FIG. 11. The Web service login page 3100 illustrated in FIG. 11 includes a "Login with Account of External Web A" button 3101 and a "Login with Account of External Web B" button 3102.

Here, in a case where the user U clicks the "Login with Account of External Web A" button 3101 (step S1001), step S505 to step S525 are performed between the image-forming apparatus 10 and the external service 30A (i.e., external Web service A).

In other words, when the "Login with Account of External Web A" button 3101 is clicked, step S505 to step S525 are performed first.

Figure 11:
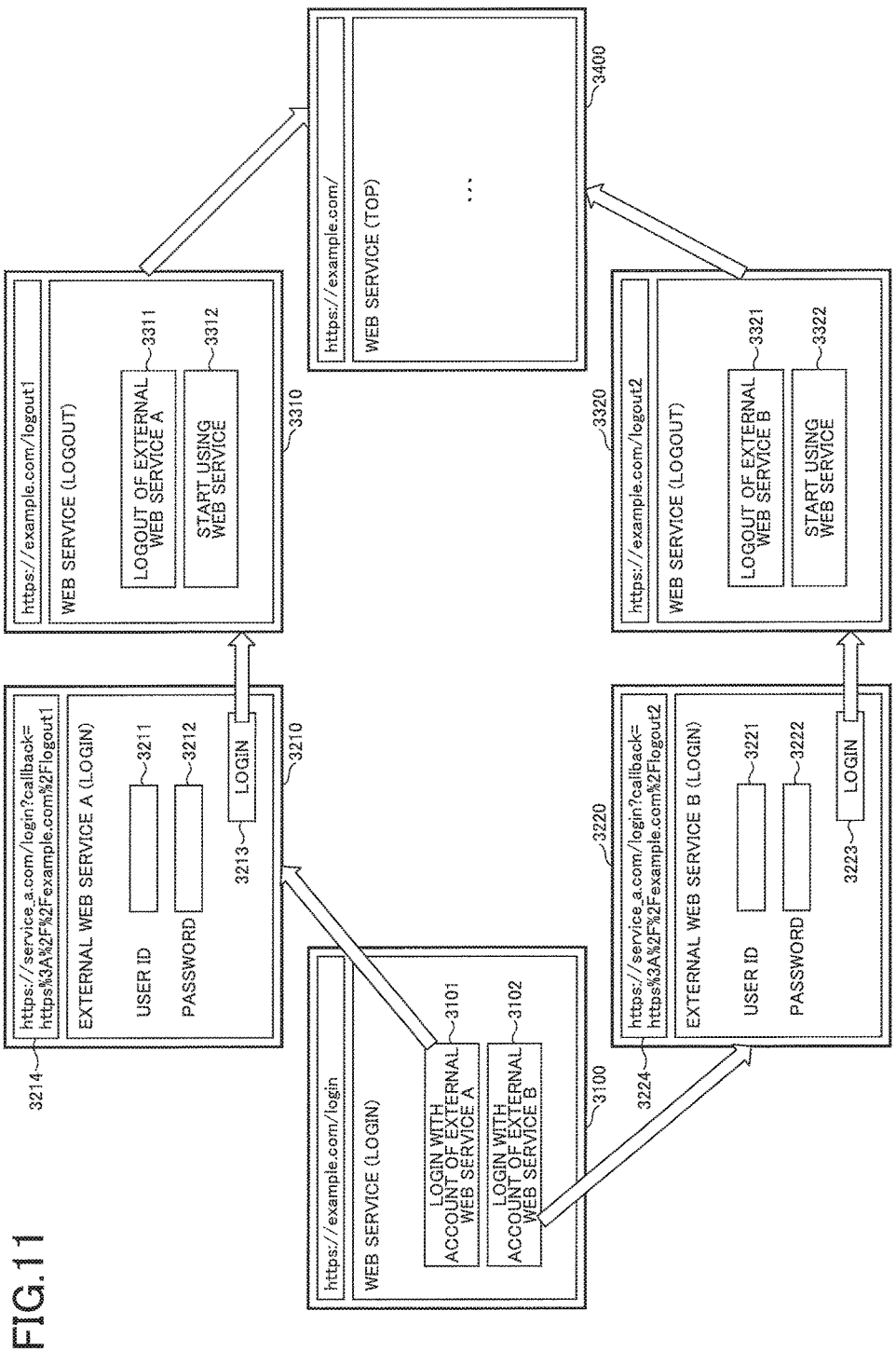
FIG. 11 is a view of a screen display transition of one example in the external authentication process in the second embodiment.

Accordingly, the input and output controlling unit 14 causes the operation panel 120 of the image-forming apparatus 10 to display, for example, an external Web service A login page 3210 illustrated in FIG. 11.

The external Web service A login page 3210 illustrated in FIG. 11 includes a user ID field 3211, a password field 3212, a login button 3213, and a URL field 3214. Note that in the URL field 3214, a URL "http://service_a.com/login" indicating the external Web service A login page 3210 is written, followed by a URL indicating a logout selection page 3310 for logging out of the external Web service A, as a callback destination URL.

Next, it is assumed that on the external Web service A login page 3210, with a user ID and a password being respectively entered in the user ID field 3211 and the password field 3212, the login button 3213 is clicked (step S508). In this case, step S509 to step S516 are performed.

Accordingly, the input and output controlling unit 14 causes the operation panel 120 of the image-forming apparatus 10 to display, for example, the logout selection page 3310 for logging out of the external Web service A illustrated in FIG. 11. The logout selection page 3310 for logging out of the external Web service A illustrated in FIG. 11 includes a "Logout of External Web service A" button 3311 and a "Start Using Web Service" button 3312.

In a case where the "Logout of External Web service A" button 3311 is clicked (step S518), step S519 to step S522 are performed. In contrast, in a case where the "Start Using Web Service" button 3312 is clicked, step S523 to step S525 are performed.

Accordingly, the input and output controlling unit 14 causes the operation panel 120 of the image-forming apparatus 10 to display, for example, a Web service top page 3400 illustrated in FIG. 11.

Alternatively, in a case where the user U clicks the "Login with Account of External Web B" button 3102 (step S1002), step S505 to step S525 are performed between the image-forming apparatus 10 and the external service 30B (i.e., external Web service B).

In other words, when the "Login with Account of External Web B" button 3102 is clicked, step S505 to step S507 are performed first.

Accordingly, the input and output controlling unit 14 causes the operation panel 120 of the image-forming apparatus 10 to display, for example, an external Web service B login page 3220 illustrated in FIG. 11.

The external Web service B login page 3220 illustrated in FIG. 11 includes a user ID field 3221, a password field 3222, a login button 3223, and a URL field 3224. Note that in the URL field 3224, a URL "http://service_b.com/login" indicating the external Web service B login page 3220 is written, followed by a URL indicating a logout selection page 3320 for logging out of the external Web service B, as a callback destination URL.

Next, it is assumed that on the external Web service B login page 3220 illustrated in FIG. 11, with the user ID and the password being respectively entered into the user ID field 3221 and the password field 3222, the login button 3213 is clicked (step S508). In this case, step S509 to step S516 are performed.

Accordingly, the input and output controlling unit 14 causes the operation panel 120 of the image-forming apparatus 10 to display, for example, the logout selection page 3320 for logging out of the external Web service B illustrated in FIG. 11. The logout selection page 3320 for logging out of the external Web service B includes a "Logout of External Web service B" button 3321 and a "Start Using Web Service" button 3322.

In a case where the "Logout of External Web Service B" button 3321 is clicked (step S518), step S519 to step S522 are performed. Alternatively, in a case where the "Start Using Web Service" button 3322 is clicked, step S523 to step S525 are performed.

Accordingly, the input and output controlling unit 14 causes the operation panel 120 of the image-forming apparatus 10 to display, for example, the Web service top page 3400 illustrated in FIG. 11.

As described above, in the authentication system 1 in the present embodiment, the Web service provided by the Web service apparatus 20 is capable of performing external authentication with a plurality of external Web services. Hence, in the authentication system 1 in the present embodiment, the user U of the image-forming apparatus 10 is able to select a desired external Web service from the plurality of external Web services. This configuration enables the user U of the image-forming apparatus 10 to use accounts of various external services in the external authentication of the Web service provided by the Web service apparatus 20.

Third Embodiment

Next, a third embodiment will be described. In the third embodiment, a case where the external service 30 does not open the logout WebAPI to the public will be described.

Note that in the third embodiment, only differences from the first embodiment will be described. Components and processes having substantially same functional configurations as those defined in the first embodiment are referred to by the same numerals; accordingly, their descriptions are omitted as appropriate.

Figure 12:
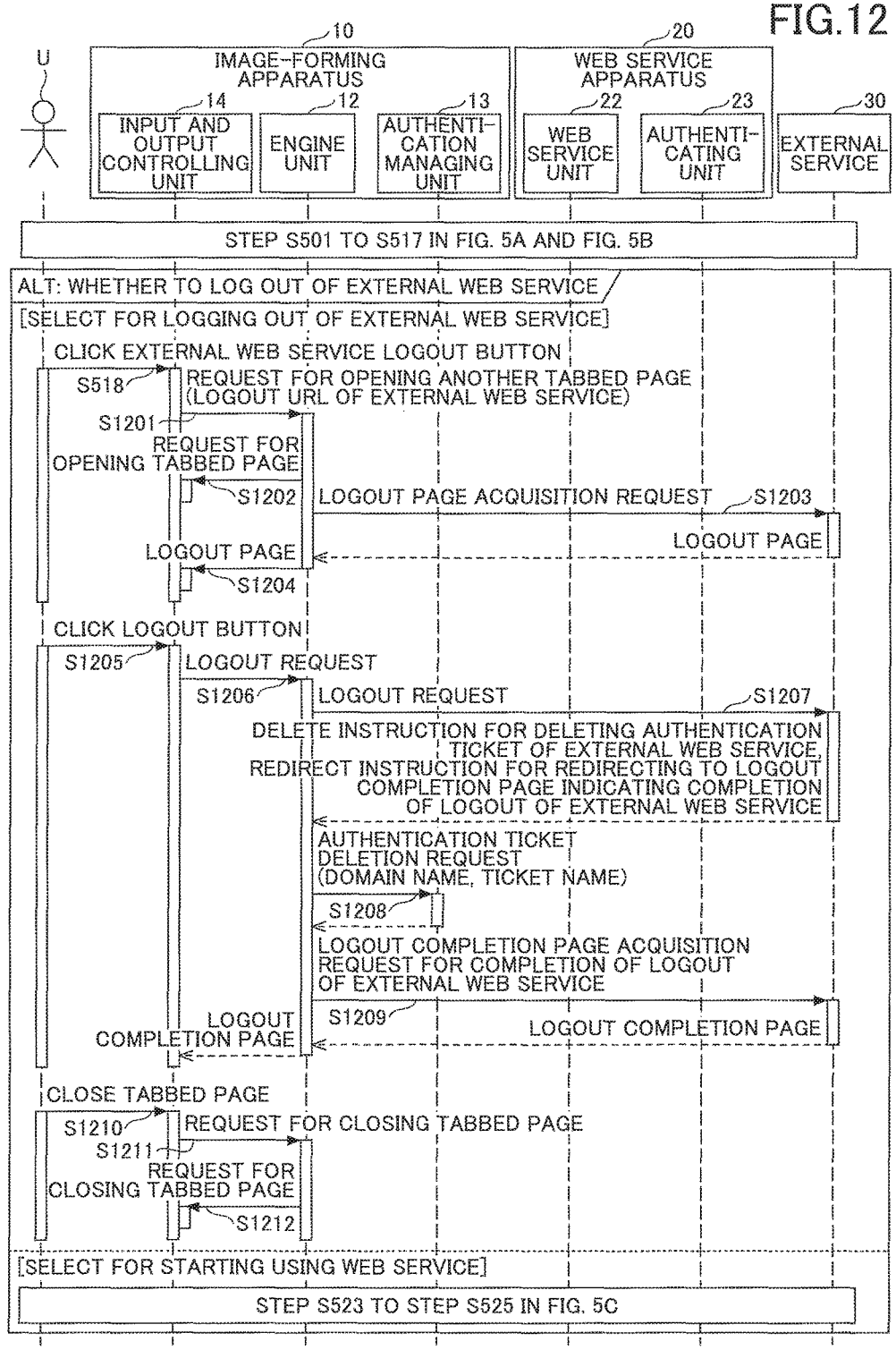
FIG. 12 is a sequence chart of one example of an external authentication process in a third embodiment.

In the following, an external authentication process performed by the authentication system 1 in the present embodiment will be described with reference to FIG. 12. FIG. 12 is a sequence chart of one example of the external authentication process in the third embodiment. Note that in the following description, it is assumed that the browser 11 of the image-forming apparatus 10 is a tabbed browser.

First, step S501 to step S517 are the same as step S501 to step S517 in the first embodiment. Accordingly, the input and output controlling unit 14 causes the operation panel 120 of the image-forming apparatus 10 to display, for example, a logout selection page 4100 illustrated in FIG. 13. The logout selection page 4100 illustrated in FIG. 13 includes a "Logout of External Web Service" button 4101 and a "Start Using Web Service" button 4102.

Note that the logout selection page 4100 may display various messages for encouraging the user U to log out of the external Web service. Such messages include, for example, "To delete the authentication information of the external Web service, please click the "Logout of External Web Service" button. After logging out of the external Web service, please click the "Start Using Web Service" button".

Herein, in a case where the user U clicks the "Logout of External Web Service" button 4101 (step S518), the input and output controlling unit 14 receives such an operation of clicking the button, and transmits a request for opening another tabbed page to the engine unit 12 (step S1202).

Note that a URL indicating an external Web service logout page 4200, to be described later, is embedded in the "Logout of External Web Service" button 4101. Therefore, the request includes a URL indicating the external Web service logout page 4200.

Herein, the "Logout of External Web Service" button 4101 can be defined in HTML tags in which JavaScript JavaScript (registered trademark) is written, as illustrated in FIG. 14, for example. This configuration enables the external Web service logout page 4200 to be displayed on another tabbed page (i.e., new tabbed page) of the browser 11.

On receiving the request for opening another tabbed page, the engine unit 12 first transmits the request for opening such a new tabbed page to the input and output controlling unit 14 (step S1202). Accordingly, the input and output controlling unit 14 causes the operation panel 120 of the image-forming apparatus 10 to display a new tabbed page.

Next, the engine unit 12 transmits a logout page acquisition request to the external service 30 (step S1203). To be specific, the engine unit 12 transmits the logout page acquisition request to the URL indicating the external Web service logout page 4200.

Then, the external service 30 responds with screen information of the external Web service logout page 4200 to the engine unit 12 of the image-forming apparatus 10.

On receiving screen information of the external Web service logout page 4200, the engine unit 12 analyses the screen information and transmits the screen information to the input and output controlling unit 14 (step S1204). Accordingly, the input and output controlling unit 14 causes the operation panel 120 of the image-forming apparatus 10 to display, for example, the external Web service logout page 4200 illustrated in FIG. 13.

In other words, the input and output controlling unit 14 causes a new tabbed page opened in step S1202 to display the external Web service logout page 4200. As described above, in the authentication system 1 in the present embodiment, for example, the external Web service logout page 4200 illustrated in FIG. 13 is displayed on such a new tabbed page of the browser 11 of the image-forming apparatus 10.

Figure 13:
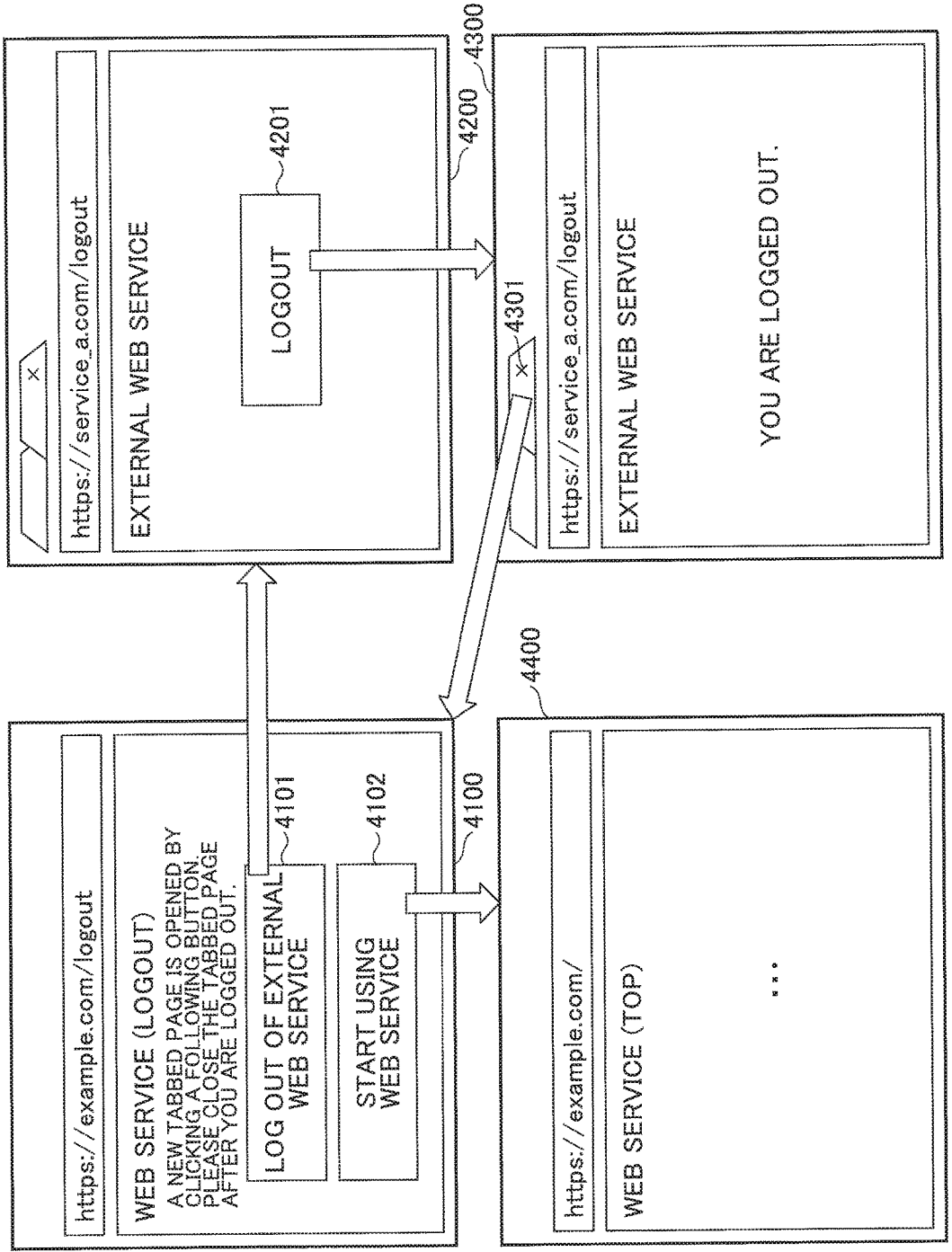
FIG. 13 is a view of a screen display transition of one example in the external authentication process in the third embodiment.

Herein, the external Web service logout page 4200 illustrated in FIG. 13 includes a logout button 4201 for logging out of the external Web service. Hence, when the user U clicks the logout button 4201 (step S1205), the input and output controlling unit 14 transmits the external Web service logout request to the engine unit 12 (step S1206).

On receiving the external Web service logout request, the engine unit 12 transmits the external Web service logout request to the external service 30 (step S1207).

Then, the external service 30 responds with a delete instruction for deleting the external Web service authentication ticket and a redirect instruction for redirecting the browser 11 to a logout completion page 4300 indicating completion of logout of the external Web service, to the engine unit 12 of the image-forming apparatus 10.

On receiving the delete instruction for deleting the external Web service authentication ticket and the redirect instruction for redirecting the browser 11 to a logout completion page 4300 indicating completion of logout of the external Web service, the engine unit 12 first transmits an authentication ticket deletion request for deleting the authentication ticket to the authentication managing unit 13 (step S1208). Note that the authentication ticket deletion request includes a domain name of the external Web service and a ticket name of the external Web service authentication ticket.

On receiving the authentication ticket deletion request, the authentication managing unit 13 deletes the authentication ticket that is stored in association with the domain name included in the deletion request and that has the ticket name included in the deletion request, from the authentication information storing unit 15.

Accordingly, the user U of the image-forming apparatus 10 logs out of the external Web service provided by the external service 30. The user U is unable to use the external Web service through the browser 11 of the image-forming apparatus 10.

Next, the engine unit 12 transmits to the external service 30 an acquisition request for acquiring the logout completion page 4300 completing logout of the external Web service (step S1209). Then, the external service 30 responds with screen information of the logout completion page 4300 completing logout of the external Web service through the engine unit 12 of the image-forming apparatus 10, to the input and output controlling unit 14. The engine unit 12 receives the logout completion page 4300 that has been responded from the external service 30, and analyses the screen information of the logout completion page 4300 indicating completion of logout of the external Web service.

Accordingly, the input and output controlling unit 14 causes the operation panel 120 of the image-forming apparatus 10 to display, for example, the logout completion page 4300 indicating completion of logout of the external Web service illustrated in FIG. 13.

Herein, in a case where the user U clicks a close button for closing the tab of the page in which the logout completion page 4300 is displayed (step S1210), the input and output controlling unit 14 receives such a closing operation and transmits a closing request for closing the page to the engine unit 12 (step S1211).

On receiving the closing request for closing the page, the engine unit 12 transmits to the input and output controlling unit 14 the request for closing the tab of the page being displayed (step S1212). Hence, the input and output controlling unit 14 causes the operation panel 120 of the image-forming apparatus 10 to display the logout selection page 4100.

Alternatively, in a case where the user U clicks the "Start Using Web Service" button 1302, step S523 to step S525 are performed. Accordingly, the input and output controlling unit 14 causes the operation panel 120 of the image-forming apparatus 10 to display, for example, a Web service top page 4400 illustrated in FIG. 13.

As described above, in the authentication system 1 in the present embodiment, the logout page of logging out of the external Web service provided by the external service 30 is displayed on the image-forming apparatus 10. This configuration encourages the user U to log out of the external Web service, even in the case where the external authentication is performed in interoperation with the external service 30 that makes the logout WebAPI unavailable to the public.

Additionally, in the authentication system 1 in the present embodiment, the logout page of logging out of the external Web service is displayed on another tabbed page that is different from the logout selection page. This configuration enables the user U to return to the logout selection page easily, by closing the tab of such another tabbed page, after the user U logs out of the external Web service.

Fourth Embodiment

Next, a fourth embodiment will be described. In the fourth embodiment, in the case where the user U clicks the login button 1203 on the external Web service login page 1200, a blank logout page 1300A is displayed instead of the logout selection page 1300. Then, for example, JavaScript embedded in the blank logout page 1300A allows the user U to log out of the external Web service. Accordingly, clicking of the login button 1203 enables the user U to log out of the external Web service automatically.

Note that in the fourth embodiment, only differences from the first embodiment will be described. Components and processes having substantially same functional configurations as those defined in the first embodiment are referred to by the same numerals; accordingly, their descriptions are omitted as appropriate.

In the following, the external authentication process performed by the authentication system 1 in the present embodiment will be described with reference to FIG. 15A and FIG. 15B. FIG. 15A and FIG. 15B are sequence charts of one example of an external authentication process in the fourth embodiment.

First, step S501 to step S517 are the same as step S501 to step S503 in the first embodiment. Then, the engine unit 12 analyses screen information of the blank logout page 1300A, and responds with the analyzed screen information to the input and output controlling unit 14.

Figure 16:
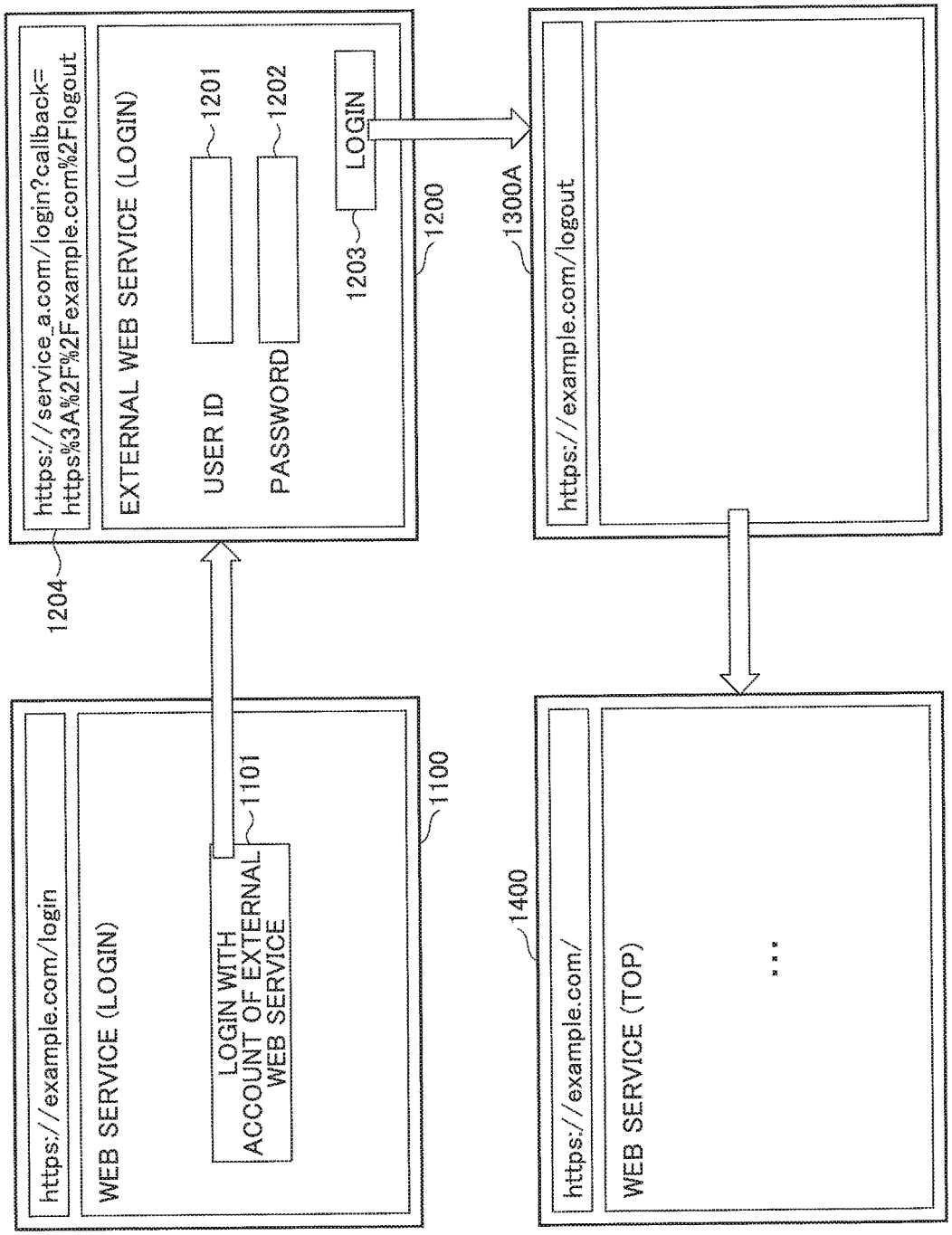
FIG. 16 is a view of a screen display transition of one example in the external authentication process in the fourth embodiment.

Accordingly, the input and output controlling unit 14 causes the operation panel 120 of the image-forming apparatus 10 to display, for example, the blank logout page 1300A illustrated in FIG. 16. For example, JavaScript for logging out of the external Web service is embedded in the blank logout page 1300A illustrated in FIG. 16.

By executing the JavaScript embedded in the blank logout page 1300A illustrated in FIG. 16, the input and output controlling unit 14 responds with the external service logout request for logging out of the external Web service to the engine unit 12 (step S1501). Note that the logout request includes the URL indicating the Web service top page 1400.

Subsequent step S520 to step S522 in the fourth embodiment are the same as step S520 to step S522 in the first embodiment.

As described above, in the authentication system 1 in the present embodiment, by clicking the login button 1203 on the external Web service login page 1200, the user U logs into the Web service and then logs out of the external Web service. The user U is able to start using the Web service. Accordingly, the user U is able to log out of the external Web service, without clicking the "Logout of External Web Service" button 1301 on the logout selection page 1300.

The present invention is not limited to these embodiments, but various variations and modifications may be made without departing from the scope of the present invention.

What is claimed is:

1. An apparatus for coupling through a network to an external authentication system to use of an external service and to a service providing system to provide a service through authentication performed by the external authentication system, the apparatus comprising:
   at least one processor, configured to perform web browsing; and
   a memory; wherein
   the at least one processor is configured to perform the web browsing to
      transmit to the external authentication system authentication credentials, usable for the authentication performed by the external authentication system in response to an input of the authentication credentials, to request the authentication to be performed by the external authentication system,
      acquire from the external authentication system a first authentication information, indicating authentication of the authentication credentials by the external authentication system,
      cause the memory to store the first authentication information,
      acquire, from the service providing system, a second authentication information, indicating permission to use the service provided by the service providing system,
      cause the memory to store the second authentication information,
      transmit a request to end the use of the external service,
      receive a response to the request from the external service,
      cause the memory to delete the first authentication information-in response to receiving the response to the request;
      send the second authentication information to acquire a service screen from the service providing system, subsequent to the request for ending the use of external service being transmitted; and
      cause, in response to acquiring the service screen, display of the service screen on a display.

2. The apparatus of claim 1, wherein the at least one processor is further configured to cause display of a screen including a selection screen, on a display, permitting a user to select log out of the external service, and
   wherein after causing the memory to store the first authentication information, the at least one processor is further configured to acquire from the service providing system the second authentication information, and to cause the memory to store the second authentication information, and wherein after the memory stores the second cookie, the at least one processor is further configured to transmit a logout request to the external service in accordance with an operation for selecting logging out of the external service on the selection screen, to receive a response to the logout request, and to cause the memory to delete the first authentication information.

3. The apparatus of claim 2,
wherein the at least one processor is further configured to cause display of a logout screen for logging out of the external service on a tabbed page different from a tabbed page on which the selection screen is being displayed, in accordance with the operation for selecting logging out of the external service on the selection screen, and
wherein the web browser is configured to transmit the logout request to the external service in accordance with the operation for selecting logging out on the logout screen, to receive the response to the logout request, and to cause the memory to delete the first authentication information.

4. The apparatus of claim 1,
wherein when the apparatus is coupled to a plurality of external authentication systems, the at least one processor is further configured to transmit the authentication credentials to one of the plurality of external authentication systems in response to the input of the authentication credentials to be used by the one of the plurality of external authentication systems, and is configured to request the authentication to be performed by the one of the plurality of external authentication systems.

5. The apparatus of claim 1, wherein the first authentication information and the second authentication information include cookie values.

6. The apparatus of claim 1, wherein the first authentication information and the second authentication information include domain names.

7. An authentication system for coupling through a network to an external authentication system to use an external service, the authentication system comprising:
the apparatus of claim 1; and
a server apparatus configured to provide a given service through authentication performed by the external authentication system.

8. The apparatus of claim 1, wherein the at least one processor is configured to further perform the web browsing to
receive a response to the request from the external service, subsequent to the request to end use of the external service being transmitted, wherein the first authentication information is caused to be deleted from the memory in response to receipt of the response.

9. The apparatus of claim 1, wherein the first authentication information is a cookie and wherein the second authentication information is a cookie.

10. An authentication method used in an apparatus for coupling through a network to an external authentication system to use an external service and to a service providing system to provide a service through authentication performed by the external authentication system, the authentication method comprising:
transmitting to the external authentication system, authentication credentials usable for the authentication performed by the external authentication system in response to an input of the authentication credentials, to request the authentication to be performed by the external authentication system;
acquiring from the external authentication system a first authentication information, indicating authentication of the authentication credentials by the external authentication system;
causing a memory to store the first authentication information;
acquiring, from the service providing system, a second authentication information indicating permission to use the service provided by the service providing system;
causing a memory to store the second authentication information;
transmitting a request to end the use of the external service;
receiving a response to the request from the external service;
causing the memory to delete the first authentication in response to receiving the response to the request;
sending the second authentication information to acquire a service screen from the service providing system, subsequent to the request for ending the use of external service being transmitted; and
causing, in response to acquiring the service screen, display of the service screen on a display.

11. The information processing method of claim 10, further comprising
receiving a response to the request from the external service, subsequent to transmitting the request to end use of the external service, wherein the first authentication information is caused to be deleted from the memory in response to receipt of the response.

12. The information processing method of claim 10, wherein the first authentication information is a cookie and wherein the second authentication information is a cookie.

13. An apparatus for coupling through a network to an external authentication system to use an external service and to a service providing system to provide a service through authentication performed by the external authentication system, the apparatus comprising:
at least one processor, configured to perform web browsing; and
a memory; wherein
the at least one processor is configured to perform the web browsing to
transmit to the external authentication system authentication credentials, usable for the authentication performed by the external authentication system in response to an input of the authentication credentials, to request the authentication to be performed by the external authentication system,
acquire from the external authentication system a first authentication information, indicating authentication of the authentication credentials by the external authentication system,
acquire from the service providing system, subsequent to the first authentication information being acquired, a second authentication information, indicating permission to use the service provided by the service providing system,
transmit a request to end the use of the external service, subsequent to the first authentication information being acquired,
send the second authentication information to acquire a service screen from the service providing system, subsequent to the request for ending the use of external service being transmitted, and cause, in response to acquiring the service screen, display of the service screen on a display.

14. The apparatus of claim 13, wherein the at least one processor is configured to further perform the web browsing to
receive a response to the request from the external service, subsequent to the request to end use of the external service being transmitted, wherein the first authentication information is caused to be deleted from the memory in response to receipt of the response.

15. An authentication system for coupling through a network to an external authentication system to use an external service, the authentication system comprising:
the apparatus of claim 13; and
a server apparatus configured to provide a given service through authentication performed by the external authentication system.

16. The apparatus of claim 13, wherein the first authentication information is a cookie and wherein the second authentication information is a cookie.

17. The apparatus of claim 14, wherein the first authentication information is a cookie and wherein the second authentication information is a cookie.

* * * * *